United States Patent
Danelli et al.

(10) Patent No.: US 11,028,952 B2
(45) Date of Patent: Jun. 8, 2021

(54) PNEUMATIC AND/OR HYDRAULIC FASTENING DEVICE, IN PARTICULAR OF THE MULTIPLE-CONNECTION TYPE

(71) Applicant: Faster S.R.L., Rivolta d'Adda (IT)

(72) Inventors: Alessandro Danelli, Brignano Gera d'Adda (IT); Roberto Sorbi, Rivolta d'Adda (IT)

(73) Assignee: FASTER S.R.L., Rivolta d'Adda (IT)

(*) Notice: Subject to any disclaimer, the term of this patent is extended or adjusted under 35 U.S.C. 154(b) by 299 days.

(21) Appl. No.: 16/254,868

(22) Filed: Jan. 23, 2019

(65) Prior Publication Data
US 2019/0242511 A1 Aug. 8, 2019

(30) Foreign Application Priority Data
Feb. 2, 2018 (IT) .......................... 102018000002352

(51) Int. Cl.
| | |
|---|---|
| F16L 37/18 | (2006.01) |
| F16L 37/56 | (2006.01) |
| F16L 35/00 | (2006.01) |
| E02F 9/22 | (2006.01) |
| F16L 37/127 | (2006.01) |
| F16L 57/00 | (2006.01) |

(52) U.S. Cl.
CPC ............ *F16L 37/18* (2013.01); *E02F 9/2275* (2013.01); *F16L 35/00* (2013.01); *F16L 37/127* (2013.01); *F16L 37/56* (2013.01); *F16L 57/005* (2013.01); *F16L 2201/80* (2013.01)

(58) Field of Classification Search
CPC ......... F16L 37/18; F16L 37/127; F16L 37/56; F16L 37/565; E02F 9/2275

USPC ..................... 285/312, 394, 124.4, 124.1, 26
See application file for complete search history.

(56) References Cited

U.S. PATENT DOCUMENTS

| | | | | |
|---|---|---|---|---|
| 5,984,371 A | * | 11/1999 | Mailleux | E02F 3/3654 285/26 |
| 7,246,457 B2 | * | 7/2007 | Mieger | E02F 3/3654 172/272 |
| 2010/0052312 A1 | * | 3/2010 | Martin | E02F 3/3654 285/45 |

(Continued)

FOREIGN PATENT DOCUMENTS

| | | |
|---|---|---|
| EP | 1365074 | 11/2003 |
| EP | 2818596 | 12/2014 |
| KR | 101667983 | 10/2016 |

*Primary Examiner* — Aaron M Dunwoody
(74) *Attorney, Agent, or Firm* — Stetina Brunda Garred and Brucker

(57) ABSTRACT

A pneumatic and/or hydraulic fastening device having a fixed part adapted to constitute the end part of a first hydraulic circuit of a main operating machine, the fixed part having at least a first hydraulic coupling, the fastening device having a mobile part to constitute the end part of a second hydraulic circuit of a piece of equipment, the mobile part having at least a second hydraulic coupling, wherein the at least one hydraulic coupling of the fixed part and at least one hydraulic coupling of the mobile part are adapted to be hydraulically coupled and the fastening device has a mechanical coupling adapted to be switched between a first position and a second position, wherein the switching of the mechanical coupling into the second position translates into the mechanical coupling of the fixed and mobile parts.

15 Claims, 21 Drawing Sheets

(56) References Cited

U.S. PATENT DOCUMENTS

2016/0369923 A1\* 12/2016 Danelli ................ E02F 9/2275

\* cited by examiner

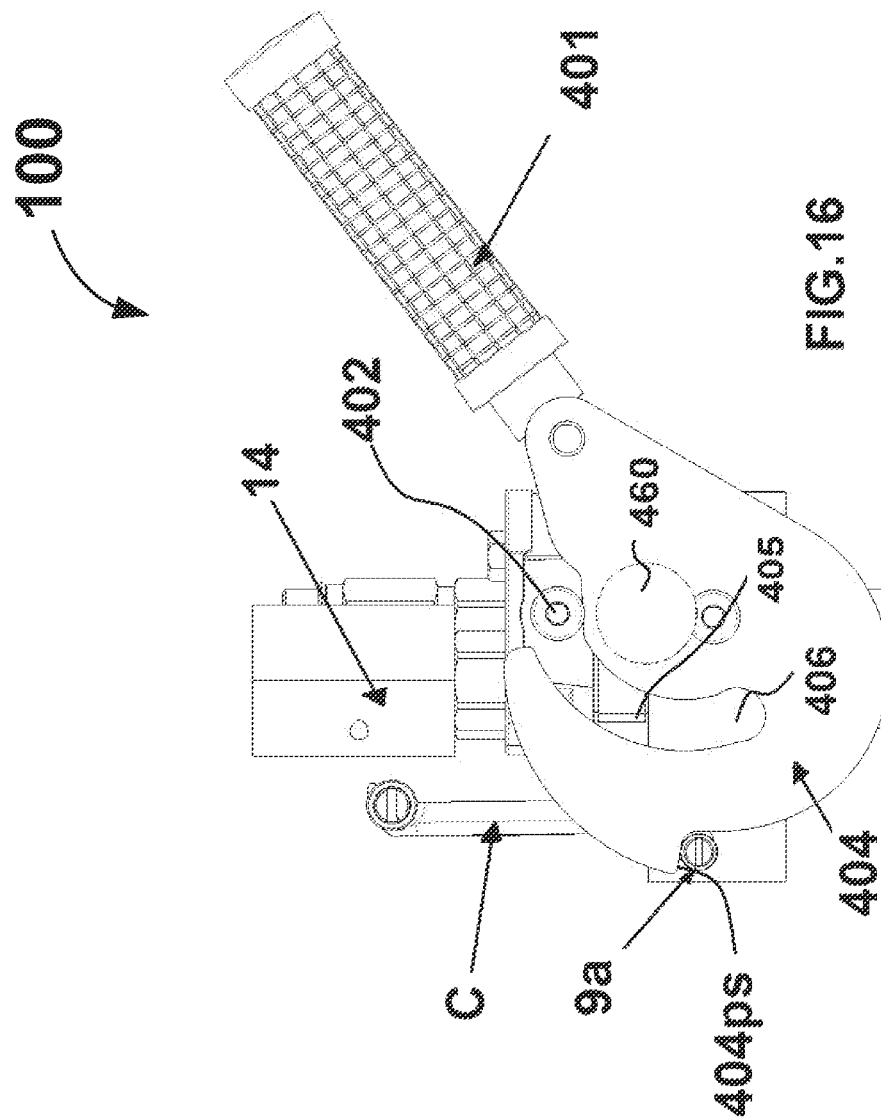

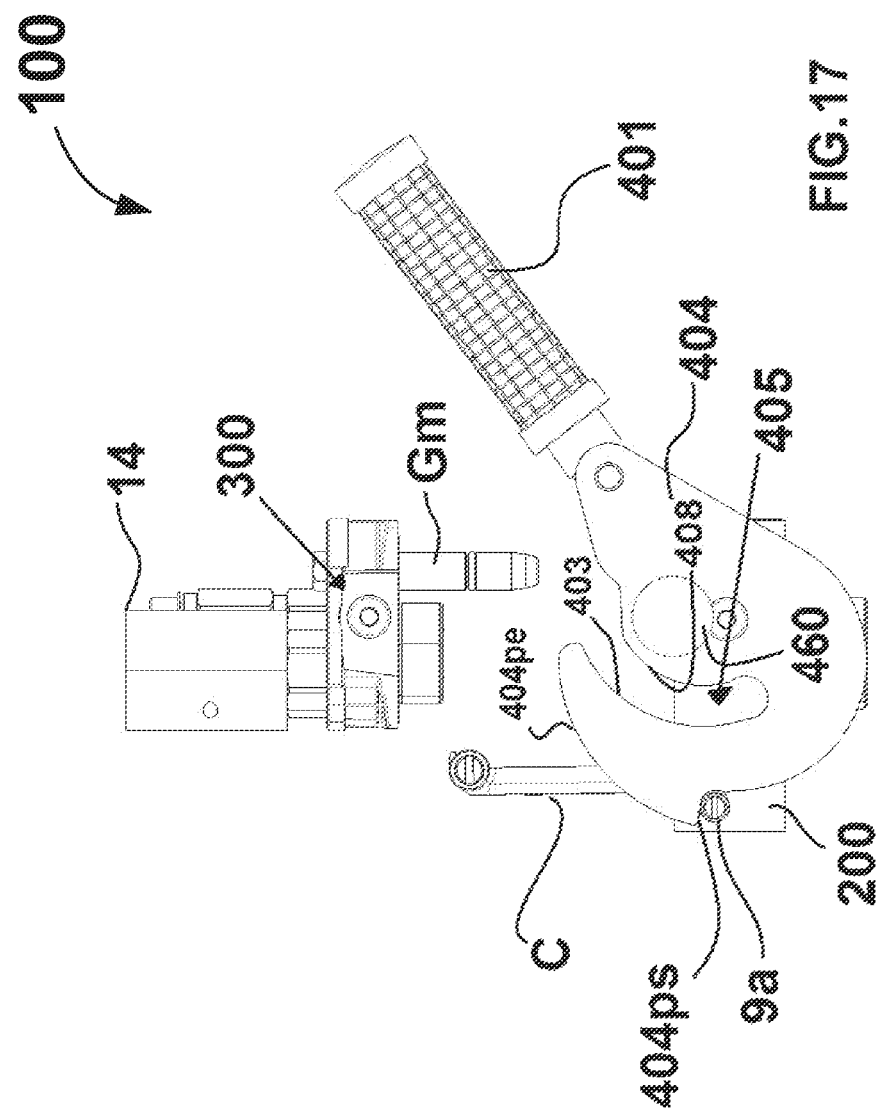

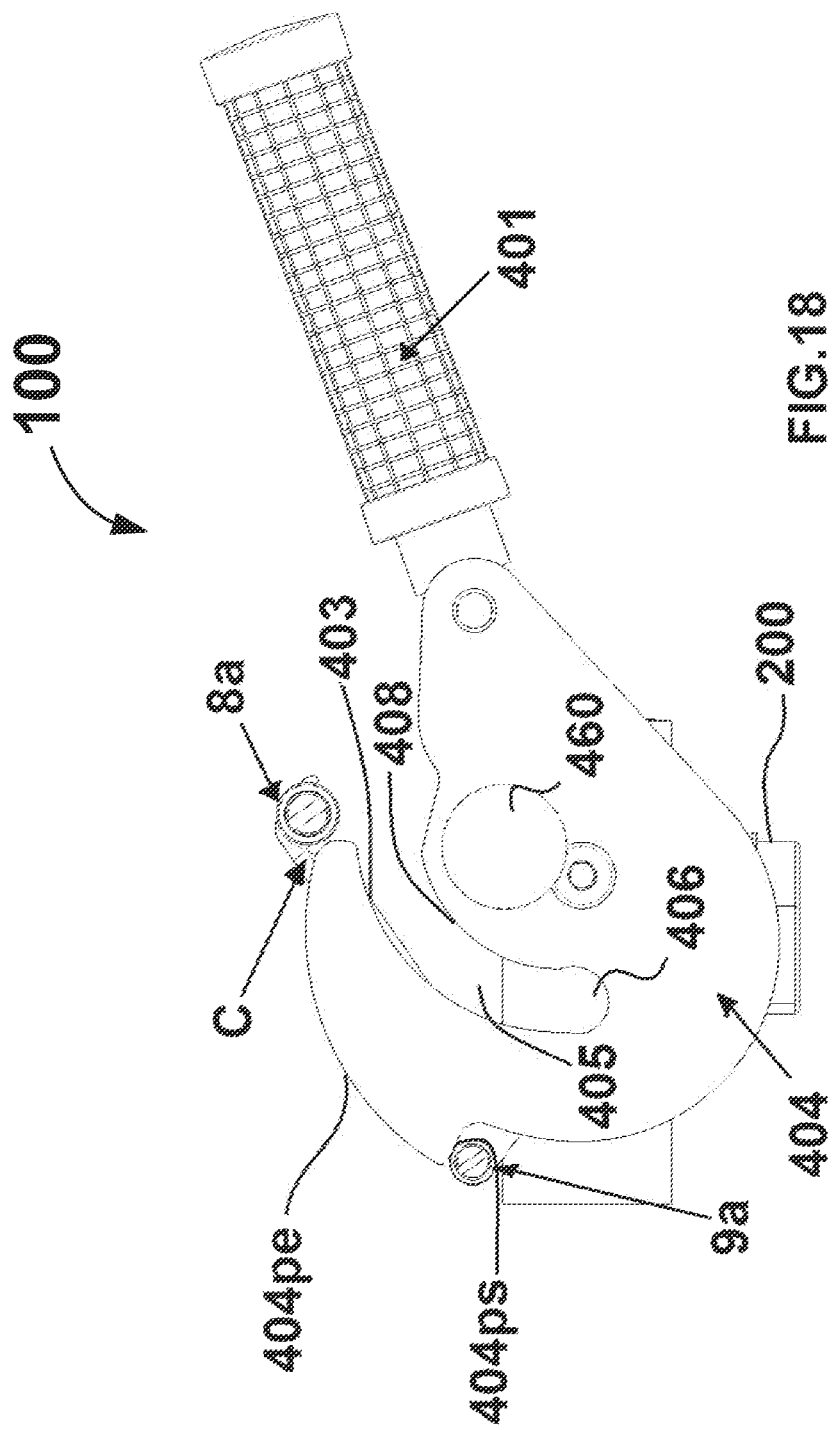

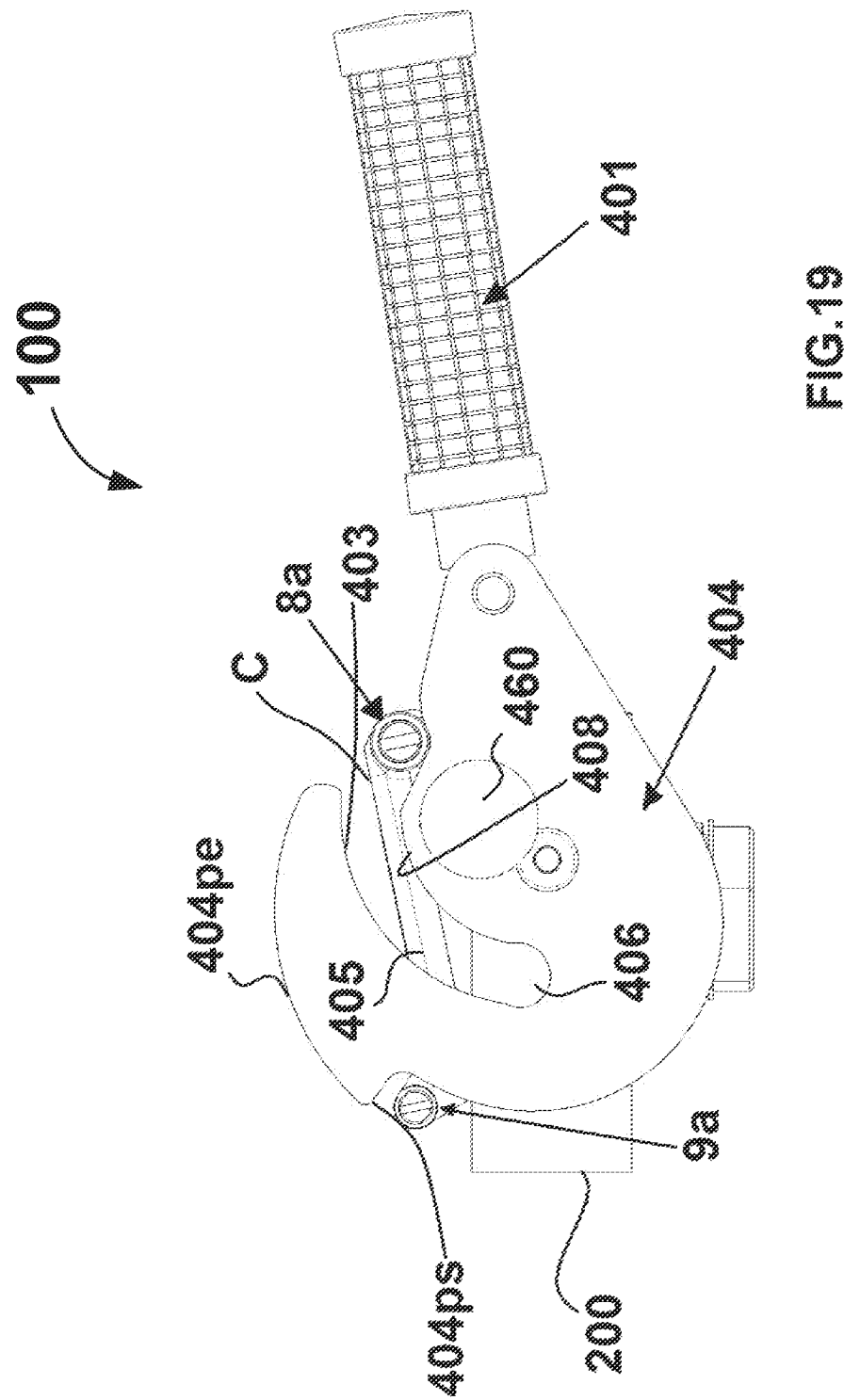

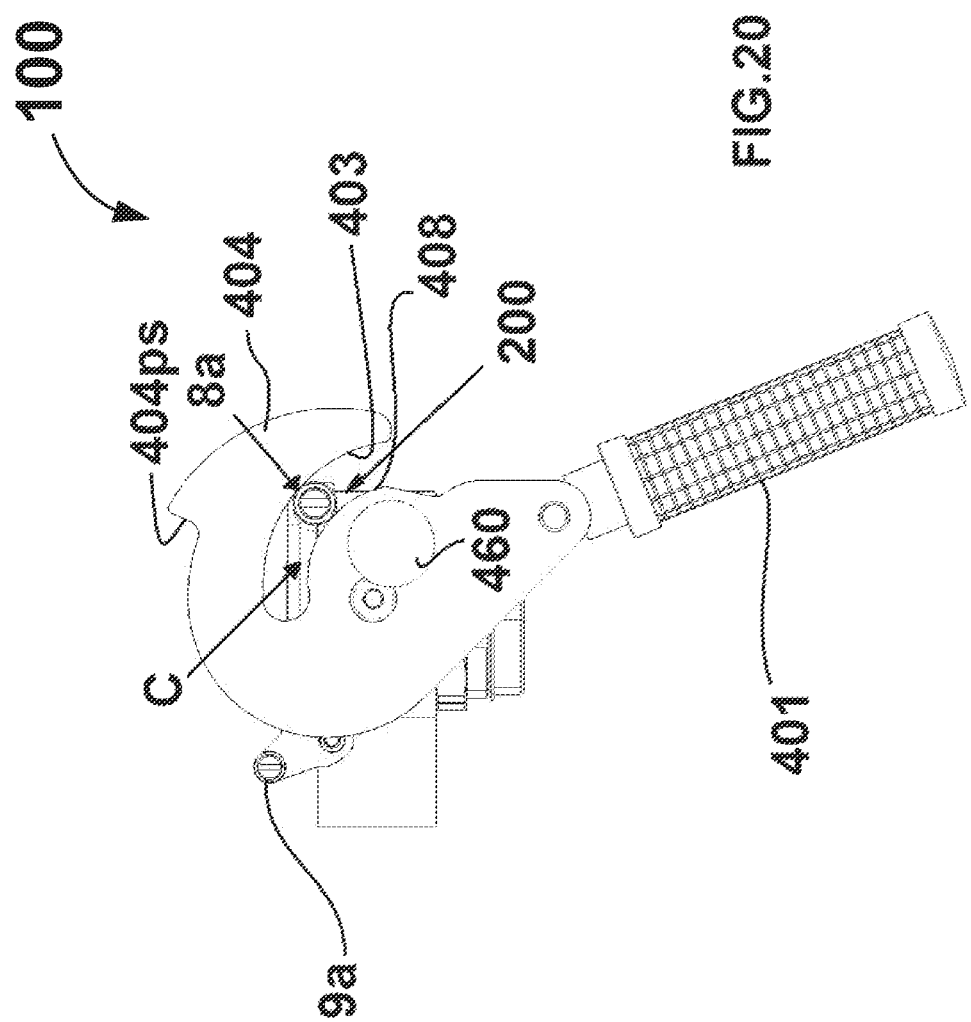

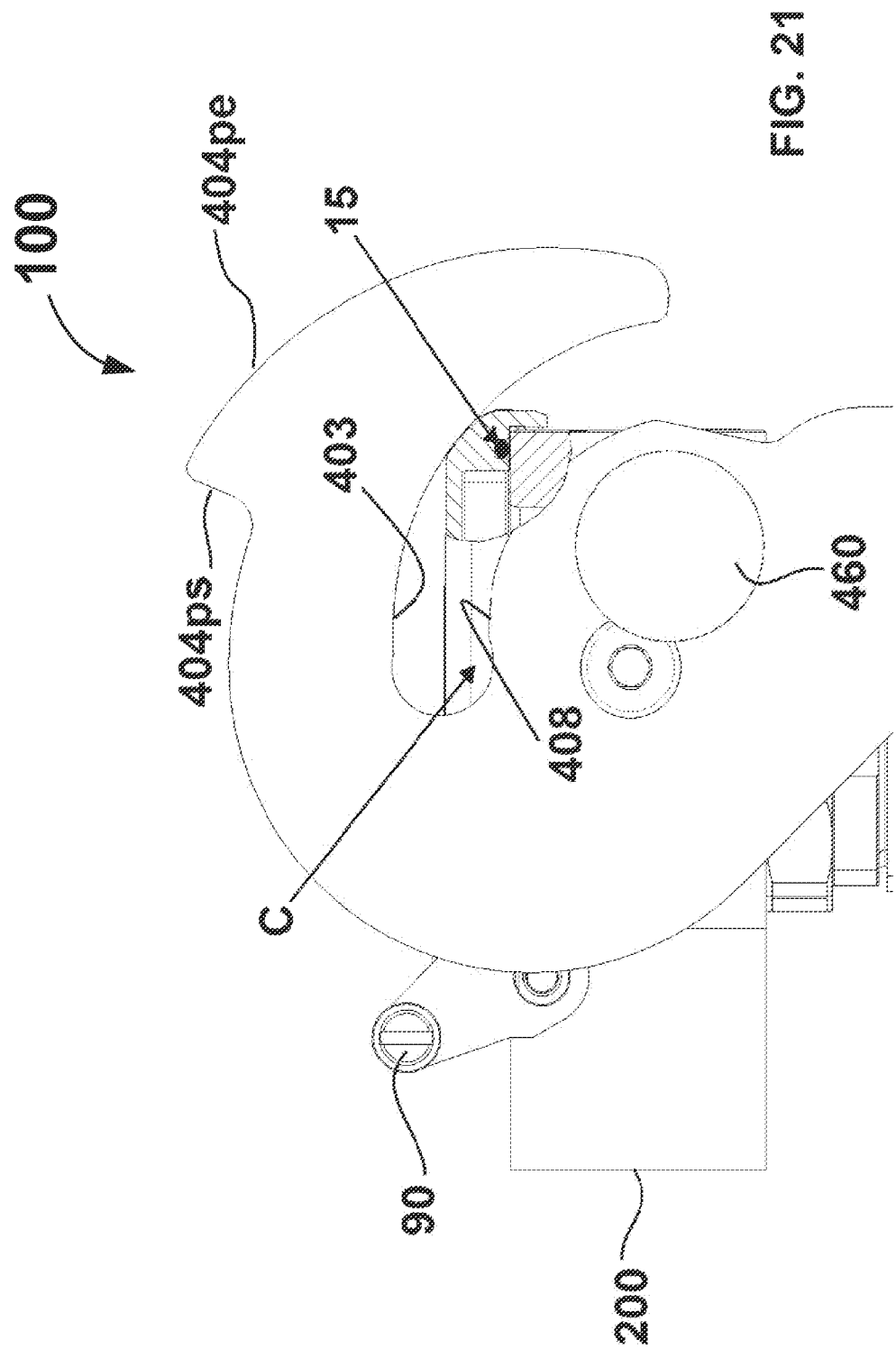

PNEUMATIC AND/OR HYDRAULIC FASTENING DEVICE, IN PARTICULAR OF THE MULTIPLE-CONNECTION TYPE

CROSS REFERENCE TO RELATED APPLICATION(S)

The present application claims priority to Italian Patent Application No. 102018000002352 filed Feb. 2, 2018, the entirety of the disclosures of which are expressly incorporated herein by reference.

STATEMENT RE: FEDERALLY SPONSORED RESEARCH/DEVELOPMENT

Not Applicable.

TECHNICAL FIELD

The present invention falls within the field of fastening devices for hydraulic and/or pneumatic applications, in particular for similar hydraulic and/or pneumatic circuits. In particular, the present invention relates to a fastening assembly for hydraulic and/or pneumatic applications of the type indicated above. In detail, the present invention relates to a fastening assembly of the multiple-connection type, that is adapted to allow the simultaneous hydraulic connection and disconnection of a plurality of male couplings with and from, respectively, a corresponding plurality of female couplings. In further detail, the present invention relates to a solution adapted to allow the protection of said male and/or female couplings under mutual release condition and to allow the removal of said protection according to simple and immediate methods, should the need arise to mutually connect said male and female couplings.

BACKGROUND ART

Quick-release fastening devices for mutual connection by means of flexible and/or rigid pipes of hydraulic circuits are known and commonly used in the prior art. For example, multiple-connection quick-release fastening devices for mutually connecting hydraulic circuits of a main tractor and of a piece of equipment (for example, of a front loader, but also of a piece of equipment pulled by or fixed to the rear lifter) are known and commonly used in the agricultural field, wherein the hydraulic connection and disconnection of the female and male couplings are obtained by means of mechanical connection and disconnection, respectively, of a fixed part (fixed block) and of a mobile part (mobile block) of the fastening device assembly.

An example of a multiple-connection fastening assembly according to the prior art is depicted in FIGS. 1 to 4.

As depicted, the fastening assembly 100 comprises a mobile part 300 intended to constitute the end part of the hydraulic circuit of a piece of equipment (e.g. a front loader), and a fixed part 200 intended to constitute the end part of the hydraulic circuit of a main operating machine (e.g. agricultural tractor) and (possibly but not necessarily) to be fixed to said main operating machine.

Again as depicted, the mobile part 300 is equipped with a plurality of couplings 301 (of the male type in the particular case depicted, but fastening assemblies in which the mobile part 300 is equipped with female couplings are known as well), wherein the fixed part 200 is equipped with a corresponding plurality of couplings 201 (of male or female type according to the type of couplings of the mobile part 300, of female or male type respectively).

Each of the couplings 201 and 301 is intended to constitute the end part of an hydraulic circuit pipe of the equipment and of the main operating machine, respectively.

The fixed part 200 is also provided with a lever 401 adapted to be switched by rotation in the two opposite rotation directions indicated by the double-headed arrow in FIGS. 1 to 4, wherein the rotation of lever 401 translates into the rotation in the same rotation direction of a pair of plates or cams P1 and P2, each of which defines a corresponding engaging throat G1 and G2. The mobile part 300 instead is provided with a pair of pawls or pins N1, N2 (only one is depicted in the drawings).

The mechanical connection of the mobile part 300 and fixed part 200, with subsequent simultaneous hydraulic connection of the respective couplings 301 and 201, occurs as follows.

With the lever 401 and the plates or cams P1 and P2 in the position in FIG. 1 (first end stop position of lever 401), the mobile part 300 is moved close (in practice positioned in front of or in any case caused to correspond with and/or match) to the fixed part 200, while ensuring to position each coupling 301 in correspondence of the respective coupling 201; this operation is facilitated by guide means (protruding pins and corresponding seats, not depicted) of the mobile part 300 and of the fixed part 200, respectively, which mutual engagement translates into the correct positioning of the mobile part 300 and fixed part 200. With the mobile 300 and fixed 200 parts positioned as described above, the rotation of lever 401 away from the first end stop position in FIG. 1 (and therefore clockwise with respect to drawings 1 to 4) translates into the engagement of the pawls N1 and N2 by the engaging throats G1 and G2 of the plates or cams P1 and P2, respectively.

Whereby, as depicted, the further rotation of lever 401 to further move away from the first end stop position and up to reaching the second end stop position in FIG. 4 translates into the permanent approaching of the mobile 300 and fixed 200 parts and in the subsequent hydraulic connection of the couplings 301 and 201 due to the shape of the throats G1 and G2, each with arc or cam development, wherein in the mutual position in FIG. 4, the mobile 300 and fixed 200 parts are mechanically coupled to each other.

Although the fastening assemblies according to the prior art of the type described above may be appreciated according to different points of view such as for example, reliability, construction simplicity, versatility and substantially contained costs, they are however not entirely free from drawbacks and/or disadvantages which the Applicant intends overcoming or at least minimizing by means of the present invention.

A first drawback relates to the fact that as depicted, the fixed part 200 comprises a cover C adapted to be switched between a first end stop position (FIG. 1), in which it allows access to the couplings 201 and therefore positioning the mobile part 300 according to the methods summarized above, and a second end stop position (not depicted), opposite to the first one, in which it prevents access to the couplings 200 and in practice covers and protects the fixed part (200), in particular from water infiltrations and/or dirt, but also from accidental knocks on the couplings 200 which could compromise the functioning thereof.

The presence of cover C therefore results in the sequence of the operations for the connection of the fixed 200 and mobile 300 parts of the fastening device 100 to comprise, in sequence:

1) lifting cover C up to the first open end stop position (FIG. 1), wherein cover C remains in open position due to solutions in themselves known;

2) lifting the connection lever 401 from the second end stop position in FIG. 4 (usual resting position) up to reaching the first end stop position (FIG. 1);

3) positioning the mobile part 300 with respect to the fixed part 200 (FIG. 3);

4) switching lever 401 from the first end stop position up to the second end stop position, with subsequent progressive mutual approaching of the mobile 300 and fixed 200 parts and final mutual coupling (with hydraulic connection of the couplings 301 and 201) of the mobile 300 and fixed 200 parts.

The need for the operator to use both hands is therefore apparent—one (e.g. the left hand) for opening cover C and the other (the right one) for positioning the mobile part 300, with apparent disadvantages also considering the tight spaces in which the operator is to operate and the difficulties to move the mobile part 300 with one hand alone.

In the fastening devices according to the prior art of the type depicted, the fixed part 200 further comprises also elastic means (not depicted), such as for example helical torsion springs or the like, whereby when the need or requirement arises to connect the mobile (300) and fixed (200) parts, cover C first is positioned in the first end stop position, against the elastic resistance of said elastic means, while once released from the stop position, cover C is automatically brought back to the second end stop (closed) position by said elastic means as the mobile part (300) moves away from the fixed part (200).

The possible wear of said elastic means and/or of the contrast and/or engaging parts involved often results in cover C not remaining in the first end stop position when desired, rather being automatically switched into the second end stop position, with serious inconveniences just as there is a desire or need to mutually connect the mobile 300 and fixed 200 parts.

Moreover, for example following an accidental impact, the cover could switch to the closed position also with the mobile part and the fixed part mutually coupled, and therefore resting on the mobile part, wherein the interference between cover and mobile part of the fastening device could create a disturbance for the operator during the disconnection of the mobile part from the fixed part.

Moreover, the accidental closing of the cover obviously generates a disturbance exactly during the connection step.

Correspondingly, the sequence of the operations for disconnecting the fixed 200 and mobile 300 parts of the fastening device 100 comprises, in sequence:

5) operating the safety button P (to free lever 401);

6) rotating lever 401 towards the first end stop position (to separate the mobile part 300 from the fixed part 200);

7) manually re-closing the cover (thus releasing the system that holds the cover in open position against the action of the elastic means).

It is therefore apparent that the same drawbacks summarized above arise also during the disconnection of the fixed 200 and mobile 300 parts.

Moreover, the so-called semi-automatic covers, and that is the ones automatically switched (or precisely semi-automatic) into the closed position by means of elastic means (usually one or more elastic springs), have the further disadvantage and/or drawback that for example, during the operations of cleaning the operating machine using high-pressure water jet machines, the cover opens or in any case is not closed in a perfect manner, and therefore with the risk that wash water comes into contact with the hydraulic lines, over time inducing the emergence of oxidization or operating problems, for example in the presence of low temperatures (ice).

DESCRIPTION OF THE PRESENT INVENTION

It is therefore the object of the present invention to overcome or at least minimize the drawbacks affecting in the solutions according to the prior art, in particular the multiple-connection fastening assemblies provided with cover.

In particular, it is an object of the present invention to arrive at a solution which allows the automatic opening of the cover when the need occurs to mutually connect the mobile part and the fixed part of the fastening device, and therefore without the need for the operator to manually switch the cover from the closed position to the open position. In greater detail, it is a further object of the present invention to ensure the substantially air-tight closing of the cover.

Moreover, it is an object of the present invention to make available a solution which allows avoiding or at least minimizing the risk of accidental and/or undesired switching of the cover from the closed position to the open position, or in any case an intermediate position different from the closed position.

In consideration both of the disadvantages encountered in the solutions according to the known art and the object summarized above, according to the present invention, there is provided a fixed block of a pneumatic and/or hydraulic fastening device, said fixed block being adapted to be fixed to a main operating machine and to be alternatively coupled to and released from a mobile block, said fixed block comprising first mechanical coupling means adapted to be switched between a first position and a second position, wherein the switching of said first mechanical coupling means of said fixed block from said first position to said second position and from said second position to said first position translates into the progressive engagement of second engaging and coupling means of said mobile block and in the mechanical coupling of said fixed block and said mobile block and respectively in the disengaging of said second engaging and coupling means of said mobile block and therefore in the mechanical release of said fixed block and said mobile block, wherein said fixed block comprises a cover adapted to be switched between a first position and a second position; and wherein said first mechanical coupling means and said cover are shaped in such a manner that, with said cover and said first coupling means in said second position, the switching of said first mechanical coupling means from said second position to said first position translates into the automatic switching of said cover from said second position to said first position.

According to one embodiment, said cover comprises first engaging and coupling means, wherein the switching of said first coupling means from said second position to said first position translates into the progressive mutual engagement of said first coupling means and of said first engaging and coupling means of said cover, and therefore in the automatic switching of said cover from said second position to said first position.

According to one embodiment, said first coupling means define a first engaging surface, wherein the switching of said first coupling means from said second position to said first position translates into the progressive mutual engagement of said first engaging surface of said first coupling means and of said first engaging and coupling means of said cover, and therefore in the automatic switching of said cover from said second position to said first position.

According to one embodiment, said first mechanical coupling means comprise a lever adapted to be switched by rotation which defines said first engaging surface, wherein the switching of said lever in said first position translates into the progressive mutual engagement of said first engaging surface of said lever and of said first engaging and coupling means of said cover.

According to one embodiment, said first coupling means define a second engaging surface, wherein the switching of said first coupling means from said first position to said second position translates into the progressive mutual engagement of said second engaging surface and said second engaging and coupling means of said mobile block and in the mechanical coupling of said fixed and mobile blocks.

According to one embodiment, said second engaging surface is defined by said lever.

According to one embodiment, said cover comprises second engaging and coupling means, and in that with said cover in said second position, the switching of said first coupling means from said first position to said second position translates into the progressive mutual engagement of said second engaging surface and said second engaging and coupling means of said cover and in the mechanical coupling of said cover.

According to one embodiment, said second engaging surface is shaped in such a manner that, with said fixed and mobile blocks mutually coupled, the switching of said first coupling means from said second position to said first position translates into a bias being exerted on said second engaging and coupling means of said mobile block by said second engaging surface, and in that with said cover in said second position, the switching of said first coupling means from said second position to said first position translates into a bias being exerted on said second engaging and coupling means of said cover by said second engaging surface.

According to one embodiment, said lever comprises a plate, wherein said first engaging surface is defined by a portion of the outer peripheral surface of said plate.

According to one embodiment, said second engaging surface is defined by a groove or blind notch which extends from said outer peripheral surface of said plate towards the inside of said plate.

According to one embodiment, said groove or notch comprises a blind end portion, wherein with said fixed and mobile blocks mutually coupled and with said lever in said first switching position, said second engaging and coupling means are positioned at said blind end portion.

According to one embodiment, said fixed block comprises at least a first male or female hydraulic coupling and is therefore adapted to constitute the end part of a first hydraulic circuit of said main operating machine.

According to one embodiment, said first male or female hydraulic coupling of said fixed block is adapted to be hydraulically coupled respectively, to a second male or female hydraulic coupling of said mobile block, wherein said mobile block is therefore adapted to constitute the end part of a second hydraulic circuit of a piece of equipment.

According to one embodiment, said at least first hydraulic coupling of said fixed part and at least a second hydraulic coupling of said mobile part are adapted to be hydraulically coupled in order to achieve the hydraulic connection respectively, between said first and second hydraulic circuit of said main operating machine and said equipment, wherein the switching of said first mechanical coupling means in said second position also translates into the mechanical coupling of said fixed and mobile blocks, also in the hydraulic connection respectively, between said first and second couplings of said fixed and respectively mobile blocks.

The object of the present invention is also a pneumatic and/or hydraulic fastening device, said fastening device comprising a fixed block adapted to be fixed to a main operating machine and a mobile block, said fixed block comprising first mechanical coupling means adapted to be switched between a first position and a second position, wherein the switching of said first mechanical coupling means of said fixed block from said first position to said second position and from said second position to said first position translates into the progressive engagement of second engaging and coupling means of said mobile block and in the mechanical coupling of said fixed block and said mobile block and respectively in the disengaging of said second engaging and coupling means of said mobile block and therefore in the mechanical release of said fixed block and said mobile block, wherein said fixed block comprises a cover adapted to be switched between a first position and a second position; wherein said fixed block is a fixed block according to one of the embodiments of the present invention.

Further possible embodiments of the present invention are defined by the claims.

BRIEF DESCRIPTION OF THE DRAWINGS

The present invention will be explained in the following by means of the following detailed description of embodiments thereof depicted in the drawings. However, the present invention in any case is not limited to the embodiments described in the following and depicted in the drawings; by contrast, all those variants of the embodiments described in the following and depicted in the drawings, which are apparent to those skilled in the technical field, fall within the scope of the present invention.

In the drawings:

FIGS. 5 to 21 each show a perspective or side view, respectively, of a fastening assembly and/or components forming a fastening assembly according to one embodiment of the present invention.

DETAILED DESCRIPTION OF THE PRESENT INVENTION

Figure 1:
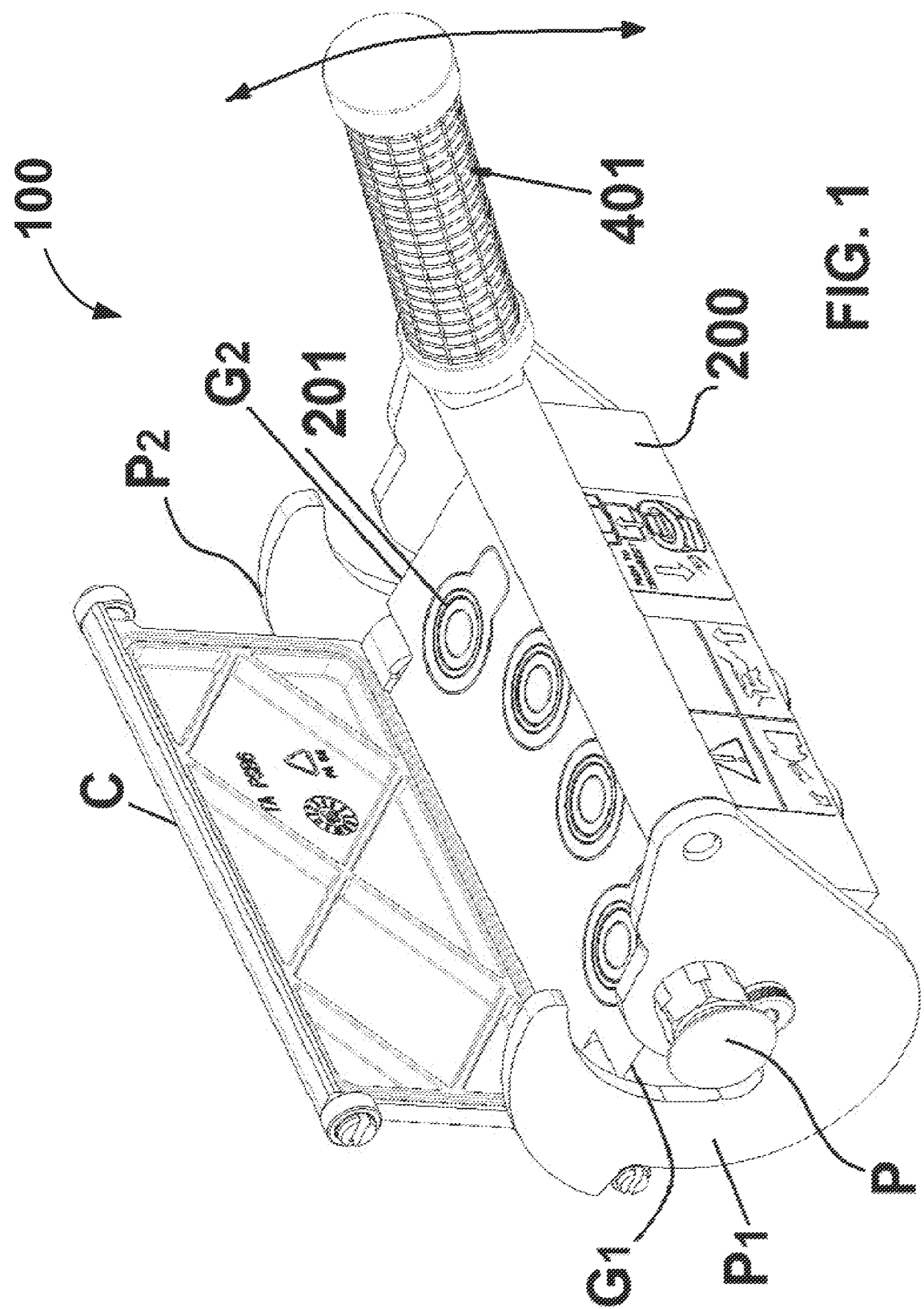
FIGS. 1 to 4 each show a perspective view of a fastening assembly and/or components forming a fastening assembly according to the prior art.
Figure 2:
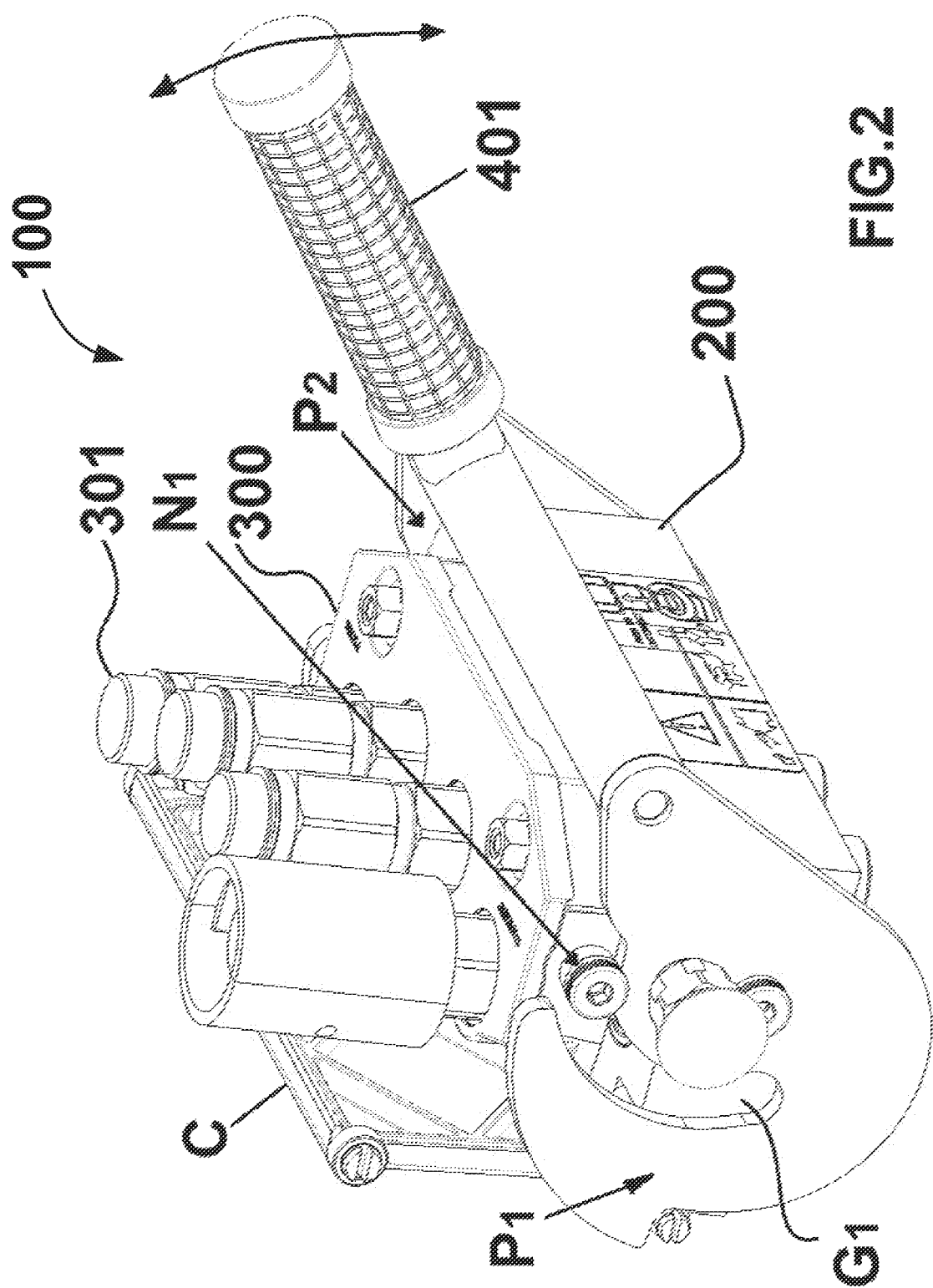
Figure 3:
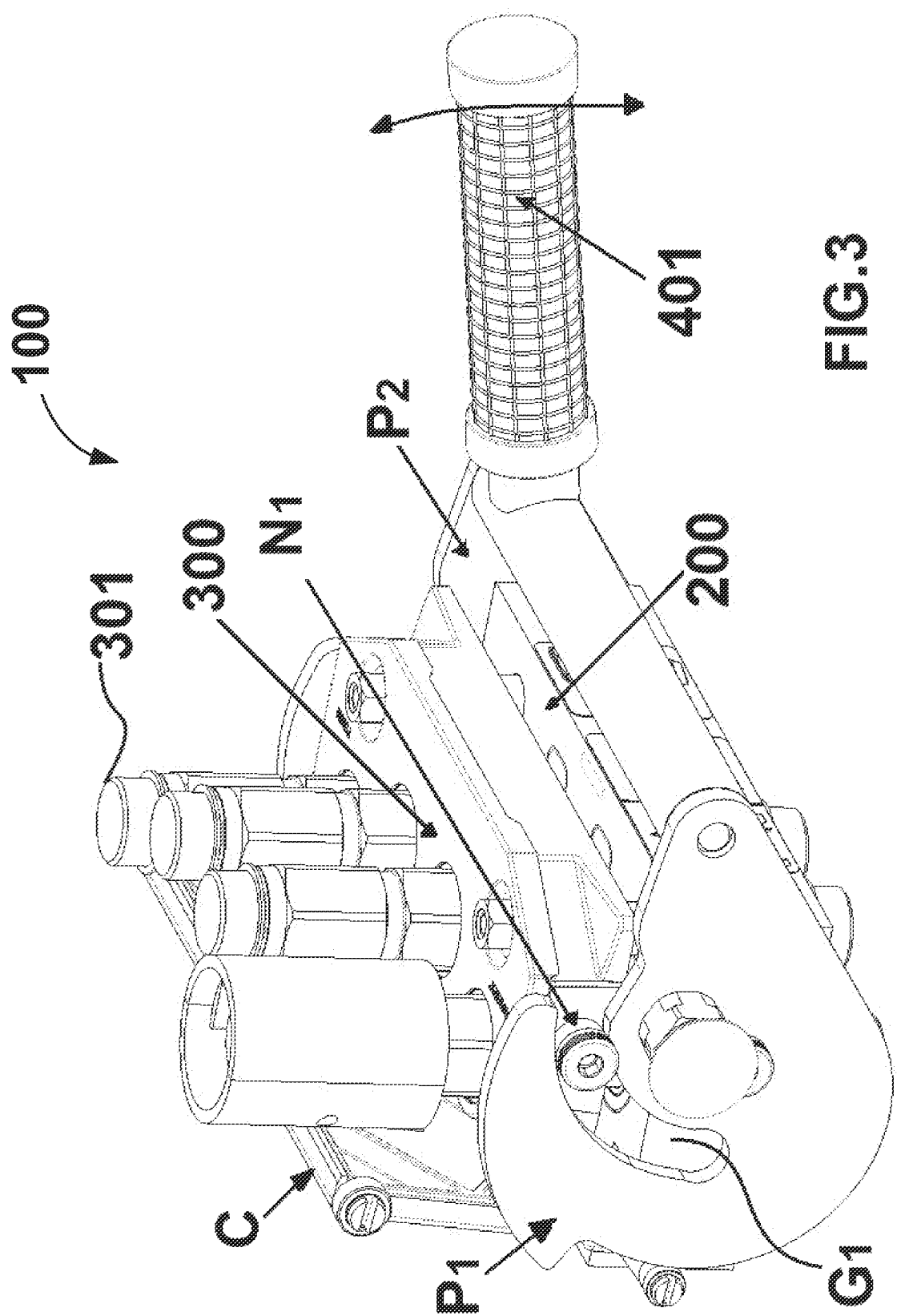
Figure 4:
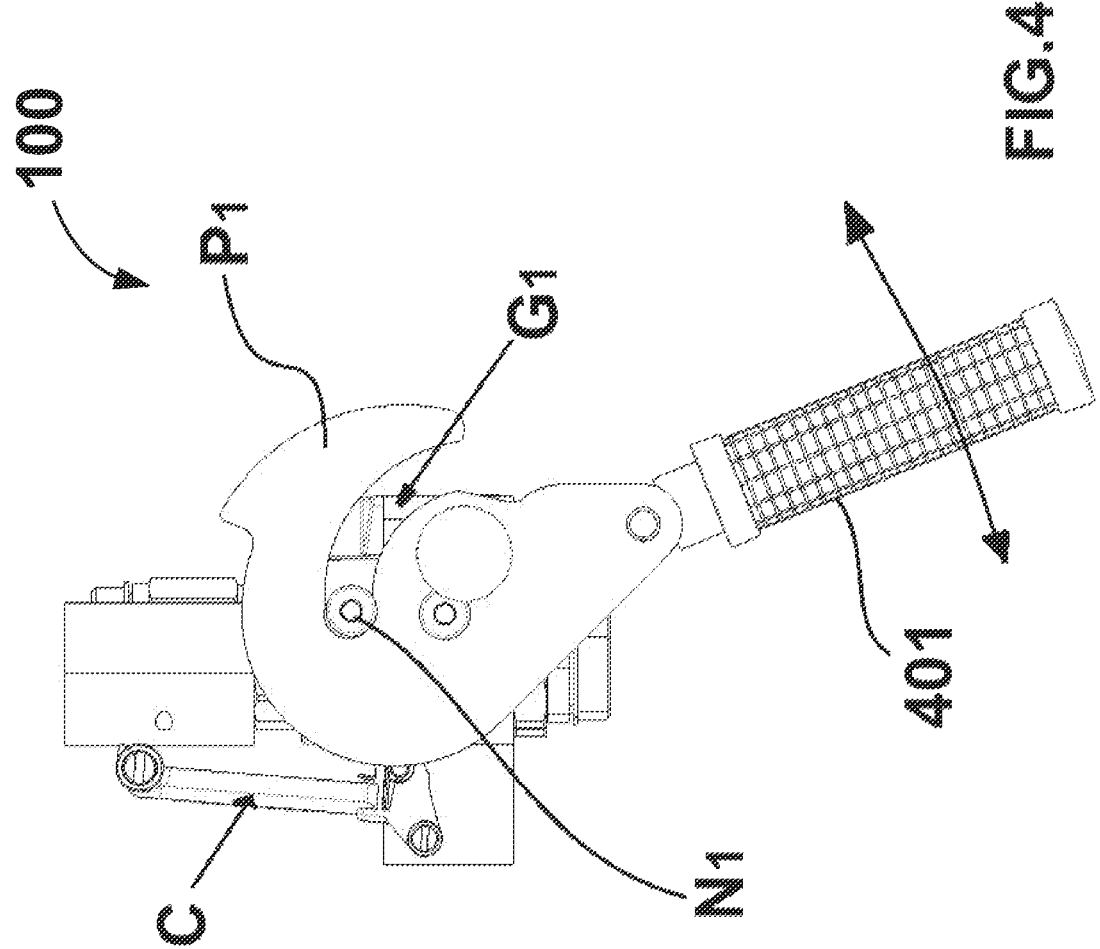
Figure 5:
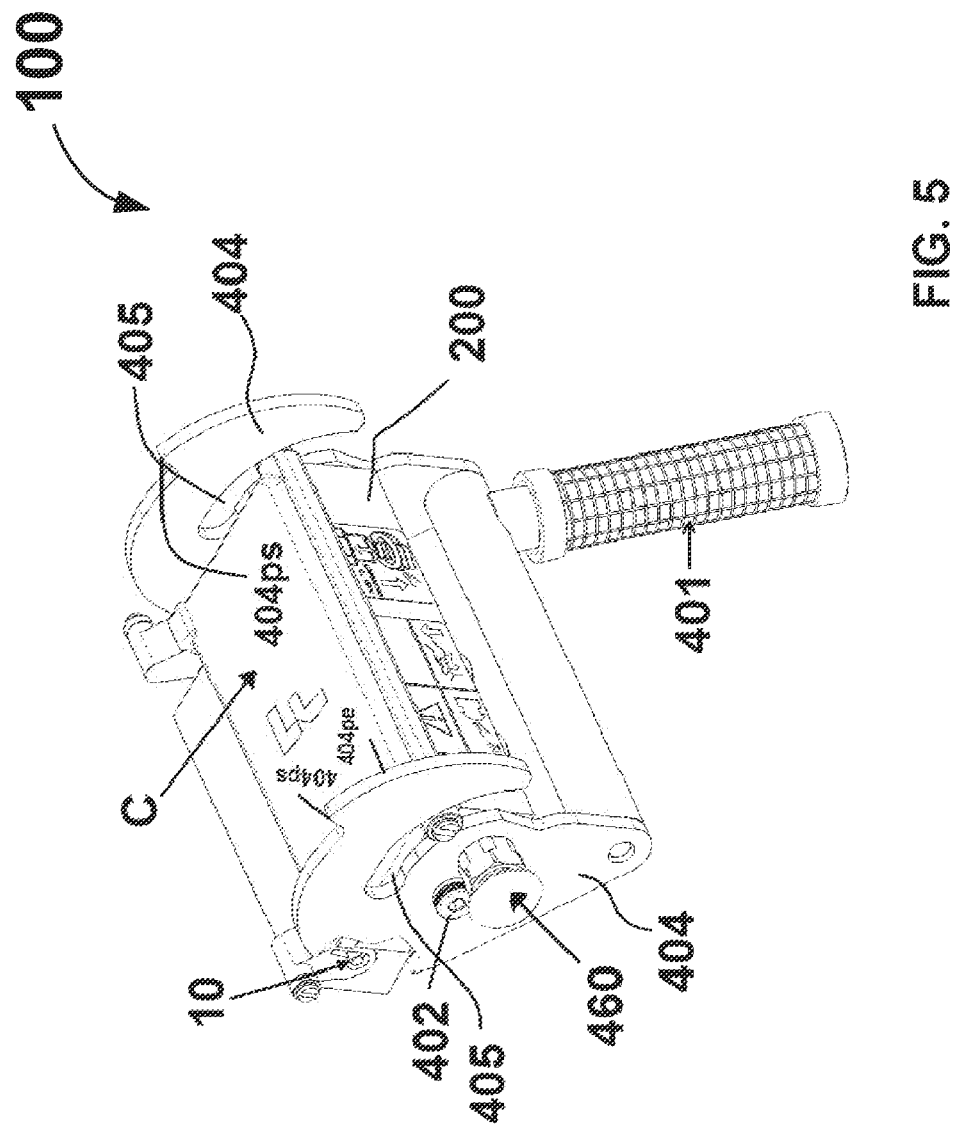

The present invention advantageously is particularly applicable in the case of multiple-connection fastening device assemblies with manually-operated lever, this being the reason why the present invention will be explained later with reference to the application thereof to a multiple-connection fastening device assembly.

The possible applications of the present invention, however, are not limited either to multiple-connection fastening devices or to the ones equipped with couplings with individual mechanical coupling (self-retaining device according to the above).

In the embodiment of the fastening device assembly according to the present invention depicted in FIGS. 5 to 21, the fastening device assembly 100 comprises a mobile part 300 (also called block in the following) with couplings 301, and a fixed part 200 (also called block in the following) with couplings 201. The fixed part 200 comprises a lever 401, the rotation of which translates into putting two plates or cams 404 into rotation in the same rotation direction, wherein each of the two plates or cams 404 defines an engaging throat (notch or groove) 405. Moreover, the mobile part 300 comprises stop means 402 (substantially two pins or pawls) adapted each to be engaged by a corresponding throat 405 during the rotation of lever 401. The mechanical coupling and release methods of the mobile 300 and fixed 200 parts substantially correspond to those of a fastening device assembly according to the prior art and therefore they may be briefly summarized as follows.

Figure 10:
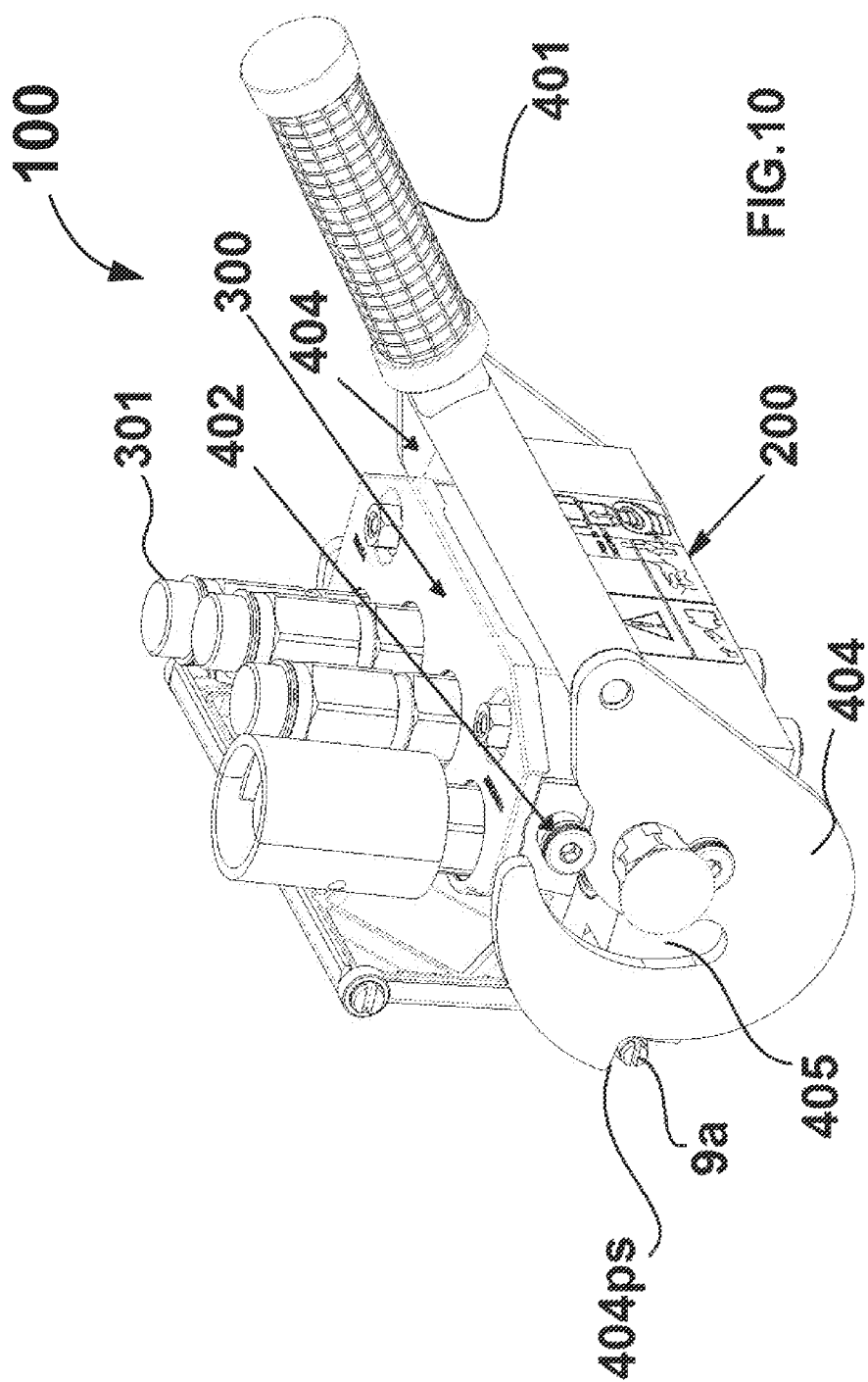

With lever 401 and the plates or cams 404 in the position in FIG. 10 (first substantial end stop position of lever 401), the mobile part 300 is moved close (in practice positioned in front of or in any case caused to correspond with and/or match) to the fixed part 200 (FIG. 11), while ensuring to position each coupling 301 at the corresponding coupling 201; this operation is facilitated by guide means Gm (protruding pins) and corresponding seats (not depicted) of the mobile part 300 and of the fixed part 200, respectively, which mutual engagement translates into the correct positioning of the mobile 300 and fixed 200 parts. With the mobile 300 and fixed 200 parts positioned as described above (FIG. 11), the rotation of lever 401 away from the first end stop position in FIGS. 10 and 11 (and therefore clockwise with respect to the drawings) translates into the engagement of the pawls 402 by the engaging throats 405 of the plates 404, respectively. It is worth noting that as mentioned, each throat 405 is in practice defined by a notch or groove which extends from the outer peripheral surface 404pe of the corresponding plate or cam 404 (FIGS. 7 and 8), wherein throat 405 thus extends from surface 404pe towards the inside of the plate or cam 404, and wherein each groove 405 defines a first contrast and engaging surface 403 and a second contrast and engaging surface 408, opposite to said first contrast and engaging surface 403, and wherein throat 405 comprises a blind end portion 406. The rotation of lever 401 away from the first end stop position thereof (in FIG. 10) therefore translates into a bias being exerted by the first contrast and engaging surfaces 403 on the respective pawls 402 and therefore on the whole mobile part 300, which therefore is progressively moved close to the fixed part 200.

Figure 6:
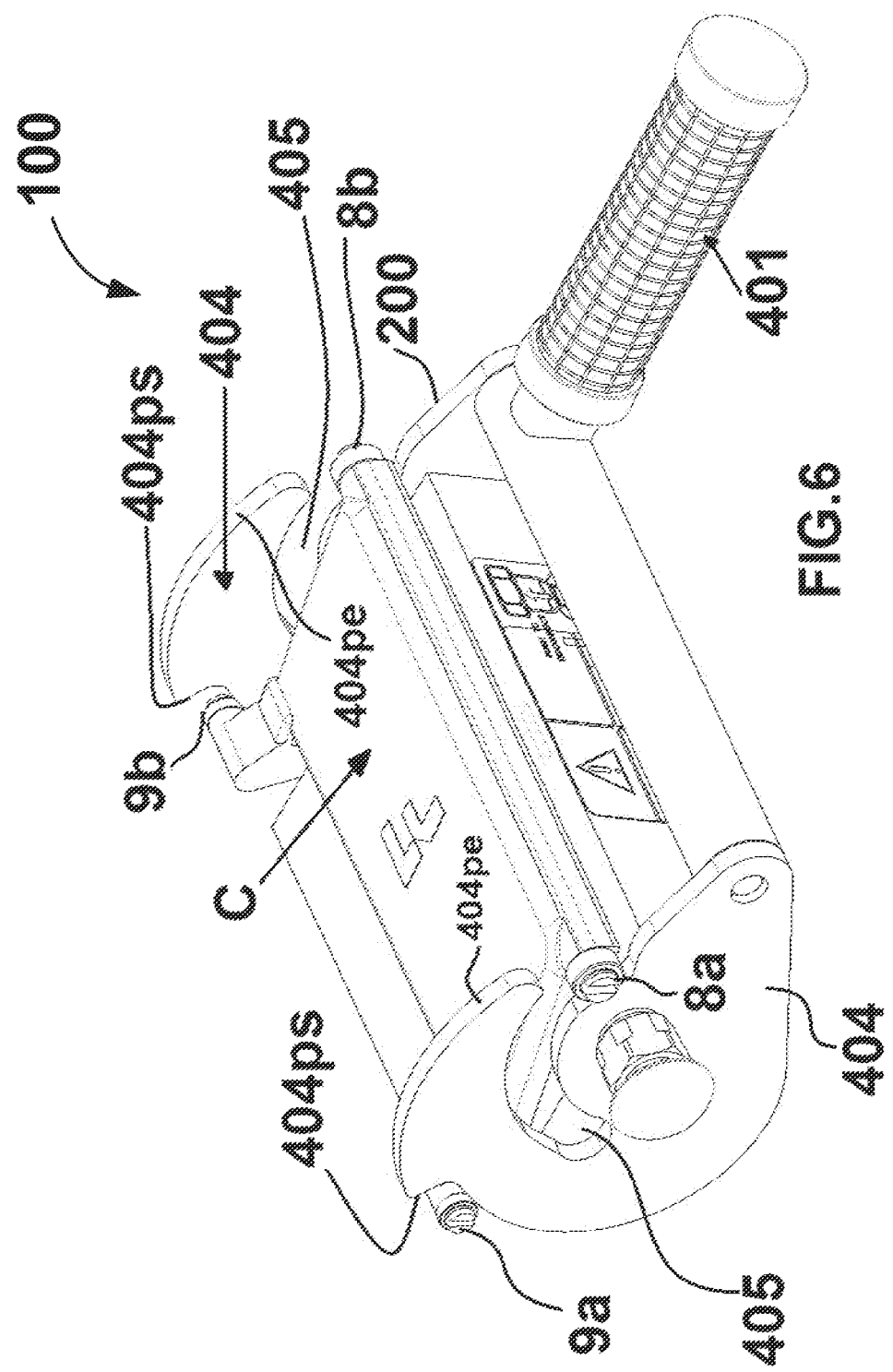
Figure 13:
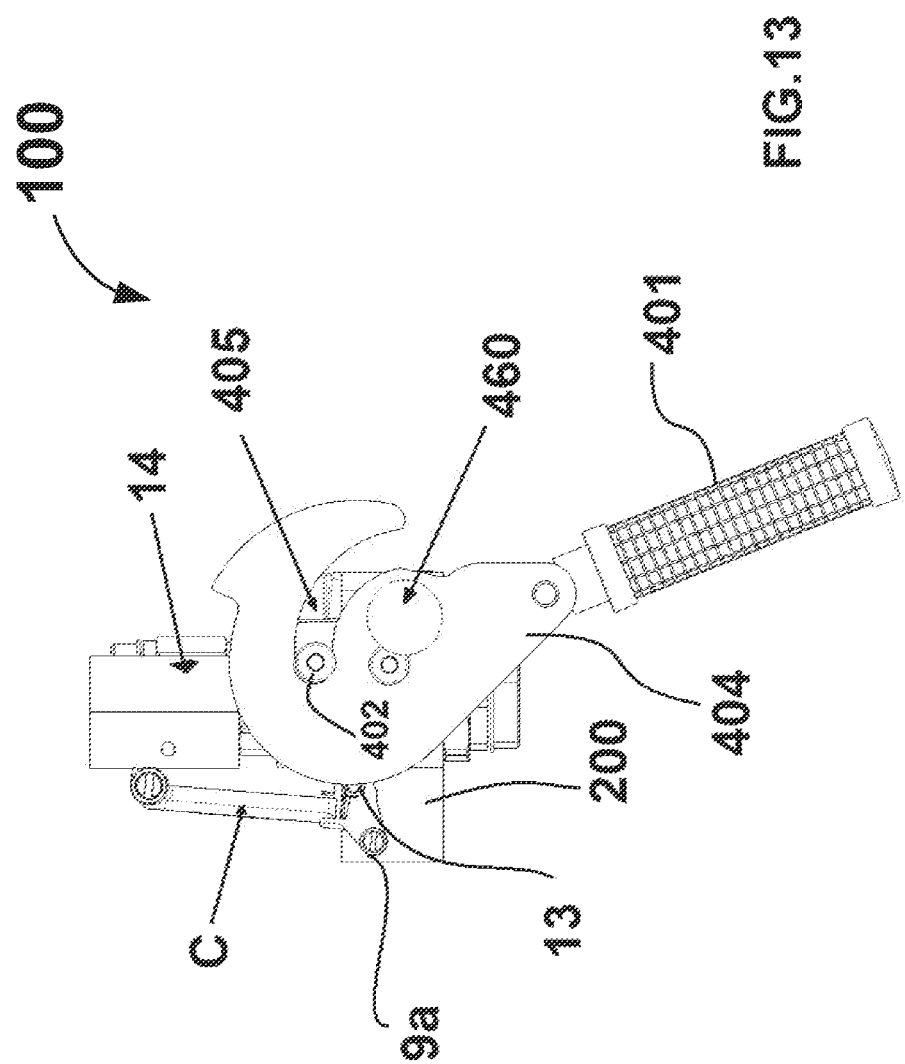

Indeed as depicted, the further rotation of lever 401 to further move away from the first end stop position and up to reaching the second end stop position in FIG. 13 (and in FIG. 5, for example) translates into the permanent approaching of the mobile 300 and fixed 200 parts and in the subsequent hydraulic connection of the couplings 301 and 302 due to the shape of the throats 405, which each defines the aforesaid first contrast and engaging surface 403 with arc or cam development, wherein in the mutual position of FIG. 6, the mobile 300 and fixed 200 parts are mechanically coupled to each other, the pawls 402 at this point being accommodated in the blind part 406 of throat 405 of the respective plate or cam 404.

The release of the mobile part 300 from the fixed part 200 obviously may occur by switching back lever 401 from the second end stop position (FIG. 13) to the first end stop position (FIG. 10). Indeed, the rotation of lever 401 away from the second end stop position (and therefore in anticlockwise direction with respect to the drawings) and up to reaching the first substantial end stop position in FIG. 10 translates into a bias exerted by the second contrast and engaging surfaces 408 on the respective pawls 402 and therefore on the whole mobile part 300, which is therefore progressively moved away from the fixed part 200, due to the shape of the throats 405, which each defines the aforesaid second contrast and engaging surface 408, also with arc or cam development, wherein with lever 401 in the first end stop position, and therefore with each of the pawls 402 practically outside the respective throat 405, the mobile part 300 is practically released from (or in any case adapted to be released from) the fixed part 200.

Moreover, as depicted, the fixed part 200 comprises safety means adapted to prevent the accidental and undesired switching of lever 401 from the second end stop position to the first end stop position.

Said safety means essentially comprise a locking and release mechanism (in itself substantially known and therefore not depicted or described in detail in the following) adapted to be switched between a first locked position in which it locks lever 401 in the second end stop position, and a released configuration in which lever 401 may be rotated with respect to the fixed part 200, from the second end stop position to the first end stop position. Moreover, the switching of the locking and release mechanism is obtained by means of a locking and release button 460 (of the related mechanism), wherein by pressing on button 460, the switching of the mechanism from the first configuration to the second configuration is obtained. In practice, therefore, with lever 401 in its second end stop position (FIG. 13), at least one plate 404 and the fixed part 200 are mutually coupled (also in this case due to the automatic action of the locking and release mechanism), whereby the switching of lever 401 from the second end stop position to the first end stop position is subordinate to the preventive switching of the mechanism from the first configuration to the second configuration by means of pressing on the button or knob 460.

It is in any case worth noting that the locking mechanism is not essential for the purposes of the present invention which, by contrast, is also applied in fastening devices without the locking mechanism, or also in fastening devices in which the locking mechanism performs the dual action of locking lever 401 both in closed position and in open position.

It is also worth noting that the two plates 404 are mutually coupled by means of a drive shaft (not depicted) which extends along a corresponding seat of the fixed part 200, and which opposite, conveniently-shaped ends engage corresponding seats shaped in corresponding manner of the two plates 404, wherein the putting into rotation of a plate 404 by means of lever 401 translates into the simultaneous rotation of the shaft and of the second plate 404. By contrast, with one of the two plates 404 locked by the locking mechanism, also the second plate 404 is locked and the two plates 404 may be put into rotation simultaneously only by means of the preventive switching of the locking mechanism from the first configuration to the second configuration according to the methods summarized above.

As mentioned, the fastening device assembly according to the present invention comprises a solution adapted to allow the automatic switching of cover C; said solution is described in detail in the following, wherein for reasons of conciseness, the switching steps of lever 401 which involve cover C are described later.

Figure 7:
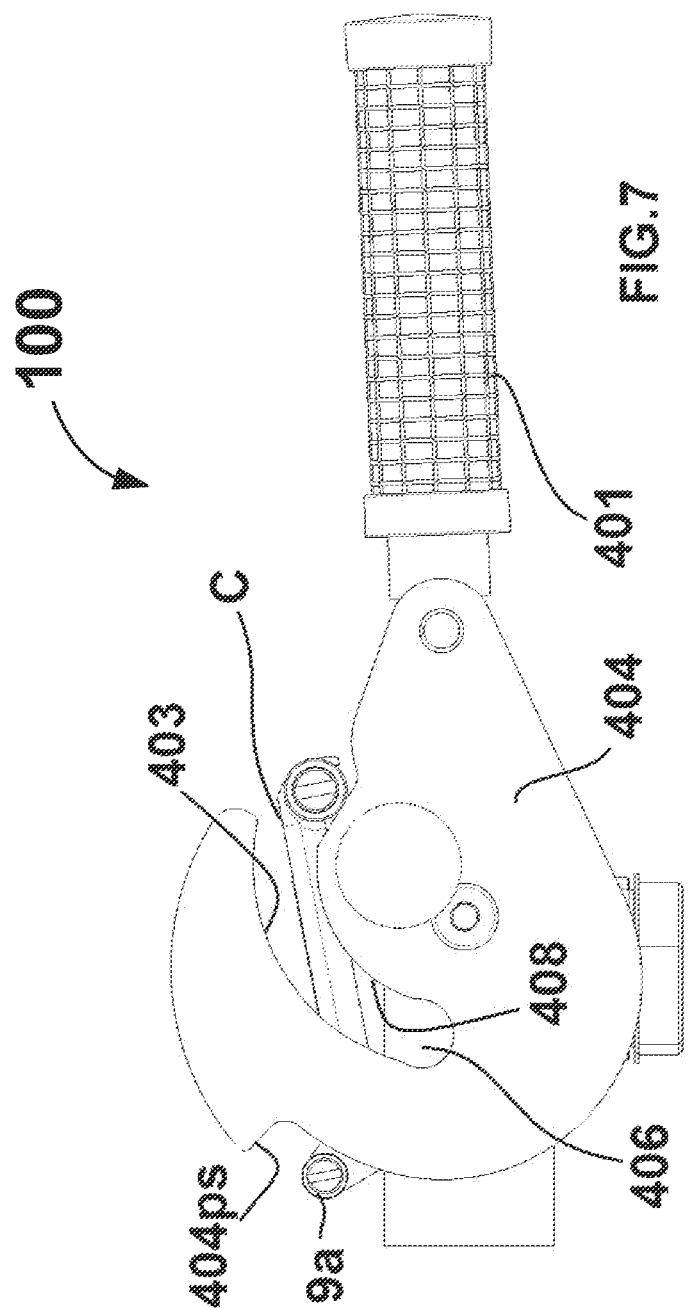
Figure 8:
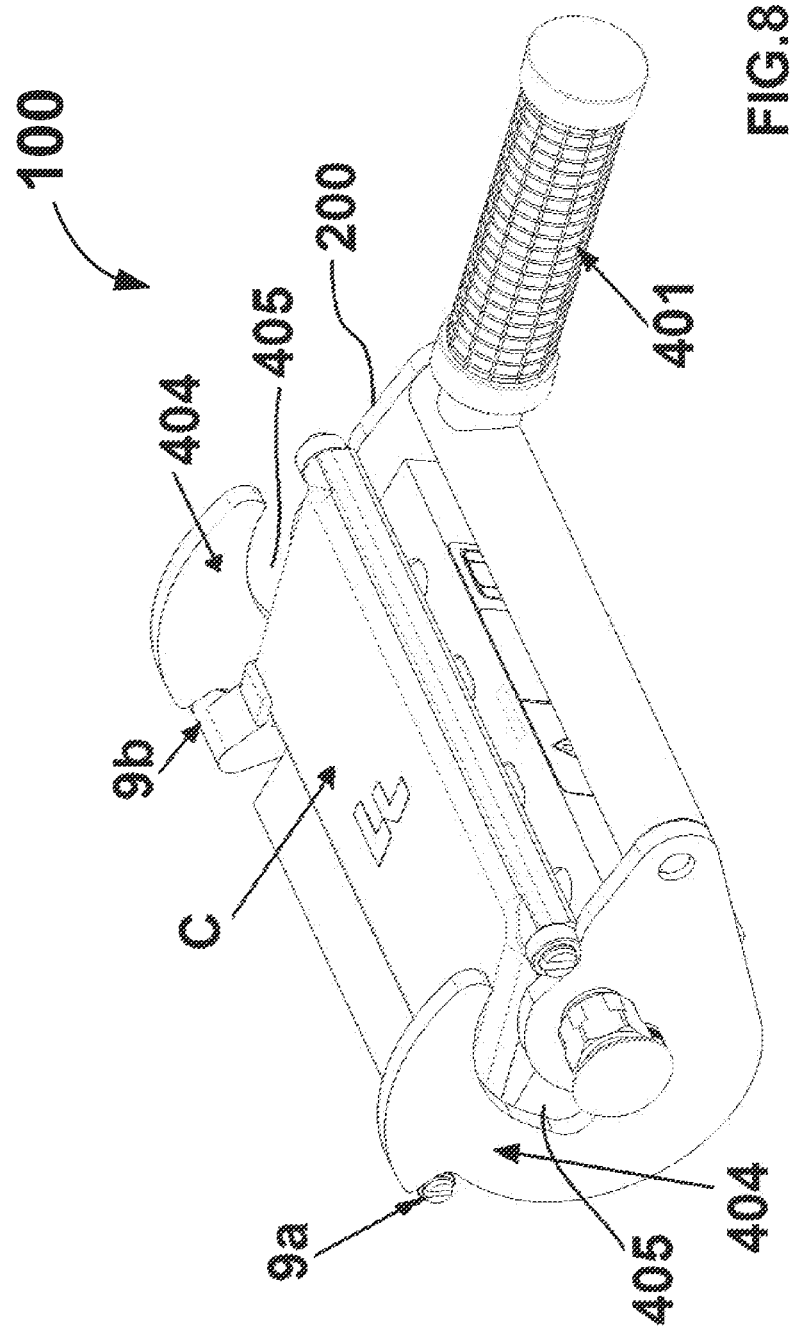
Figure 9:
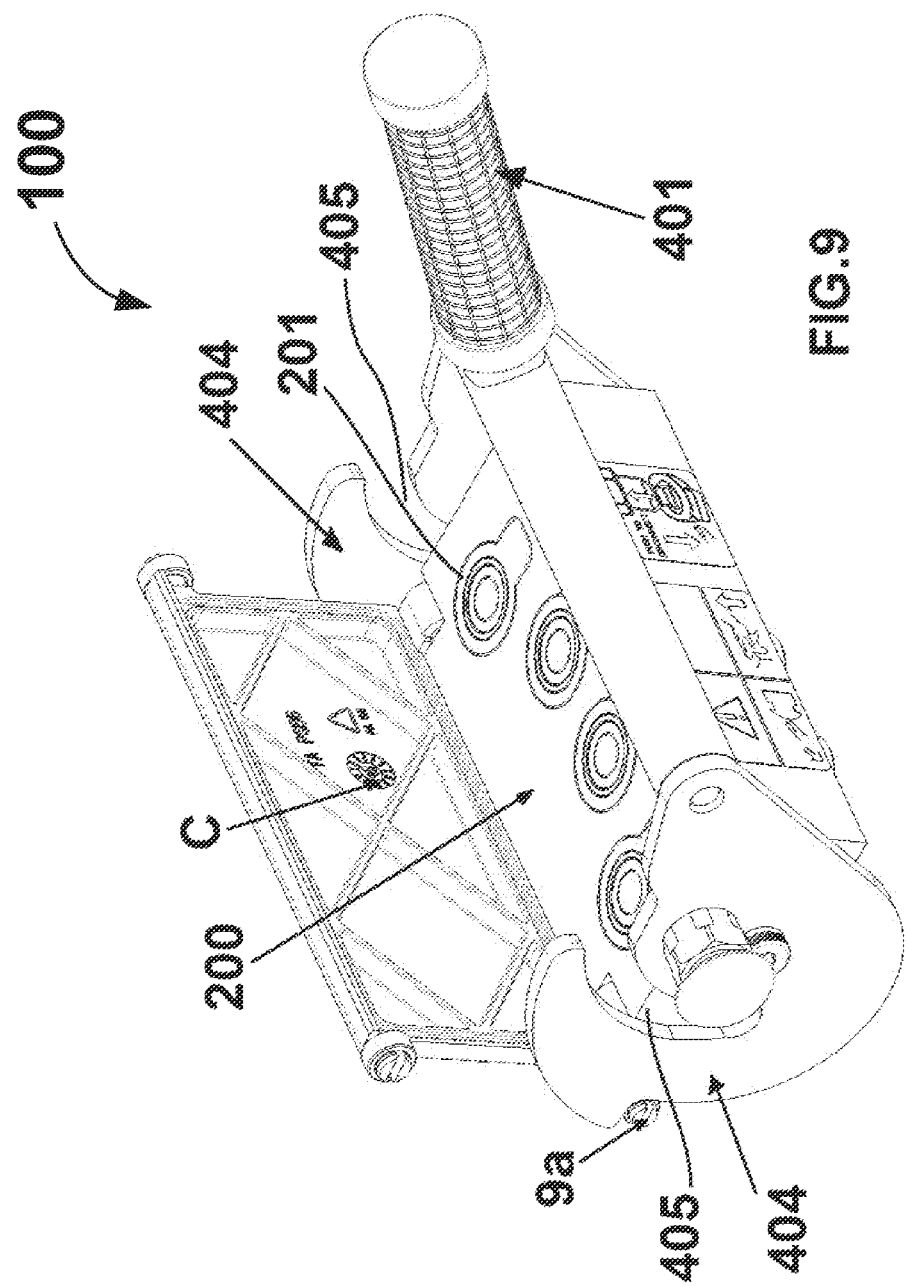

It is worth noting how—with cover C in the closed position (second substantial end stop position), in which it substantially covers block 200, thus preventing access to the couplings 201, and lever 401 lowered (second substantial end stop position)—with a first rotation of lever 401 to the first substantial end stop position (as depicted in FIGS. 6 to 7), surface 408 of each of the cams 404 exerts a bias on a roller 8a and 8b, respectively, of cover C, therefore being transformed into a first opening (rotation towards the first position) of cover C. Cover C is also coupled to the fixed part (200) by means of pins 10 which allow the rotation thereof with respect to a rotation axis parallel to the rotation axis of the cams 404 and to the common longitudinal symmetry axis of the rollers 8a and 8b, cover C also being equipped with a further pair of rollers 9a and 9b, which common longitudinal symmetry axis is parallel to the common longitudinal symmetry axis of the first rollers 8a and 8b. Hence, during the aforesaid first rotation of lever 401, a portion 404ps of the outer surface 404pe of each of the cams 404 comes into contact with a roller 9a and 9b, respectively, wherein as depicted in FIGS. 8 and 9, a further rotation of lever 401 towards the first substantial end stop position—with the rollers 8a and 8b now released from the respective cam 404—is transformed into a bias exerted by the surfaces 404ps on the rollers 9a and 9b, respectively, and therefore putting cover C into rotation towards the open position, as mentioned, the rollers 9a and 9b being offset with respect to the pins 10.

FIG. 10 shows cover C brought into the open position by the cams 404, wherein as depicted, cover C allows the positioning of the mobile part 300, the mobile 300 and fixed 200 parts under this condition being prepared to be mutually coupled, as already described above.

Figure 11:
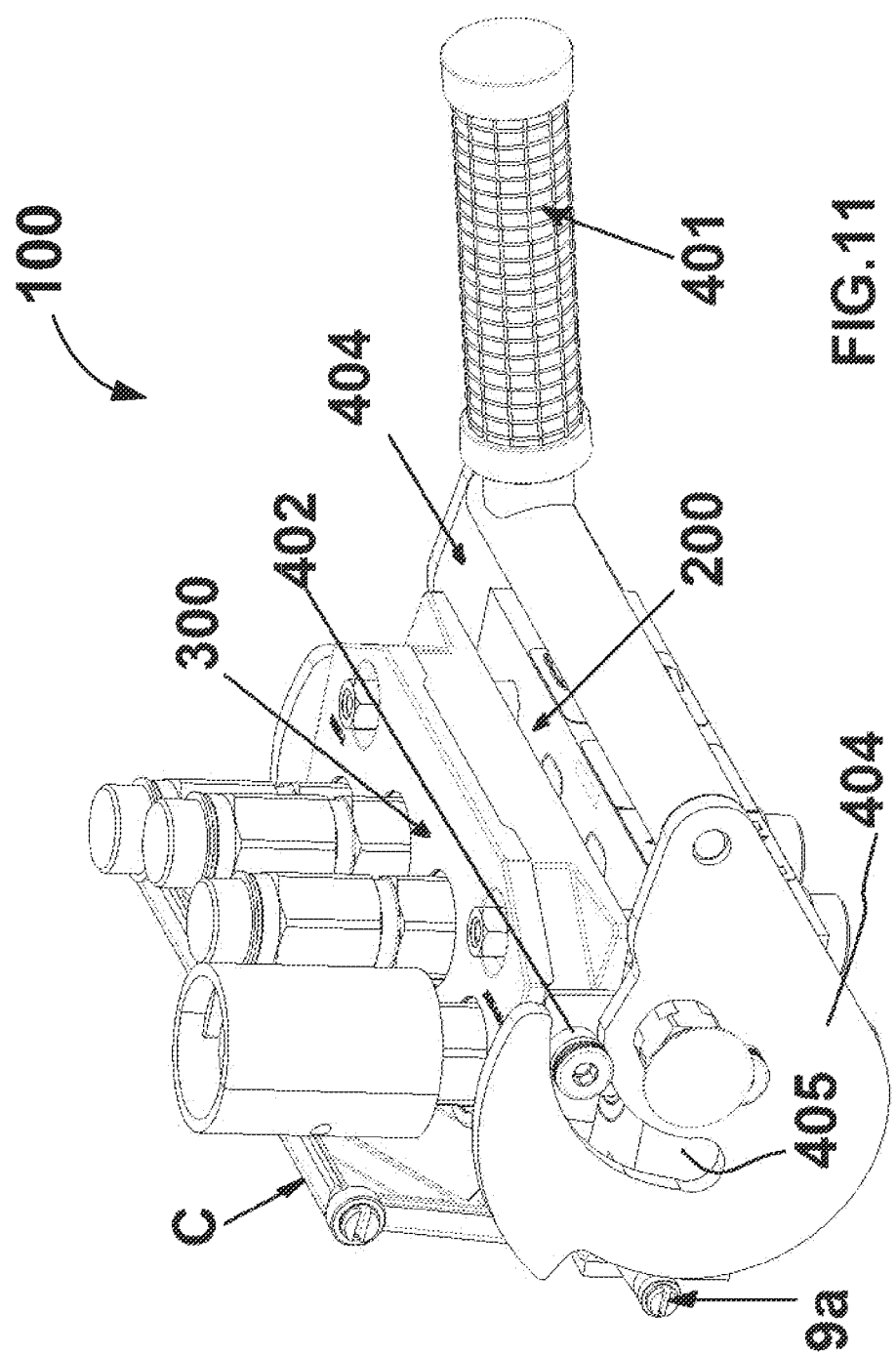

Thus, as depicted in FIGS. 11 (and 12), during a first connection step of the mobile part 300 and the fixed part 200, lever 401 and the cams 404 are rotated towards the second end stop position up to engaging the rollers 402 in the inner profile (throat 405) of the respective cam 404. It is worth noting how the rollers 9a and 9b are no longer in contact with the outer profile (outer surface 404pe) of the respective cam 404 and the cap or cover C is no longer in completely open position.

Indeed under the bias exerted by one or more torsion springs 13 which tend to bring it back to closed position, cover C comes into contact with sleeve 14 assembled at a hydraulic line 301 of the mobile part 300.

FIG. 13 shows the complete connection of the mobile part 300 in the (with the) fixed part 200.

Figure 12:
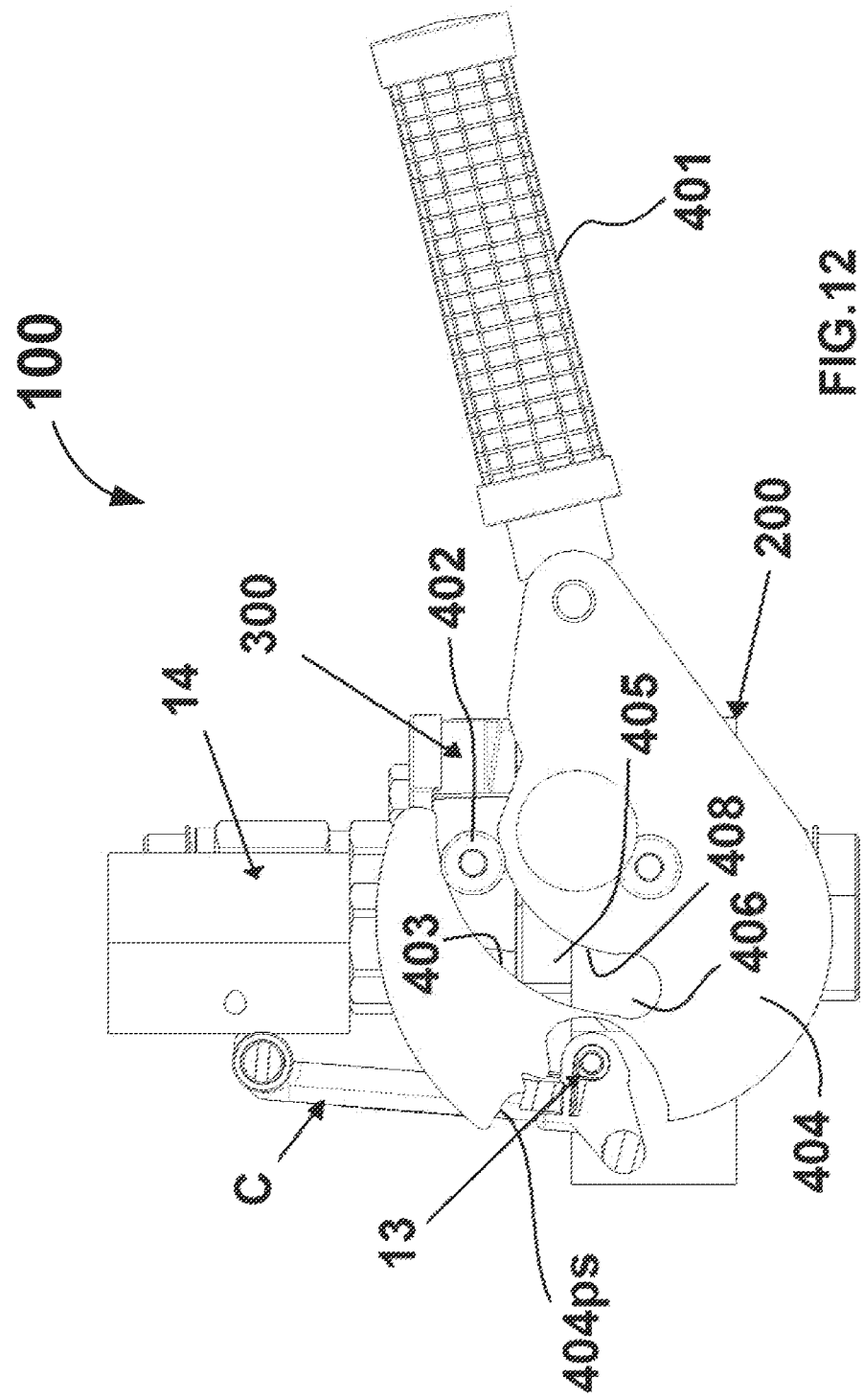

It is worth noting how sleeve 14 keeps the cap or cover C substantially in the same position shown in FIG. 12, wherein sleeve 14 also serves the function of preventing the cap or cover C from being damaged by coming into contact with the hydraulic lines of the mobile part 300.

The locking device comes into action in this position, which ensures lever 401 and cams 404 are kept in position and ensures a protection against the accidental release.

The release or disconnection step of the mobile part 300 from the fixed part 200 may be summarized as follows.

Figure 14:
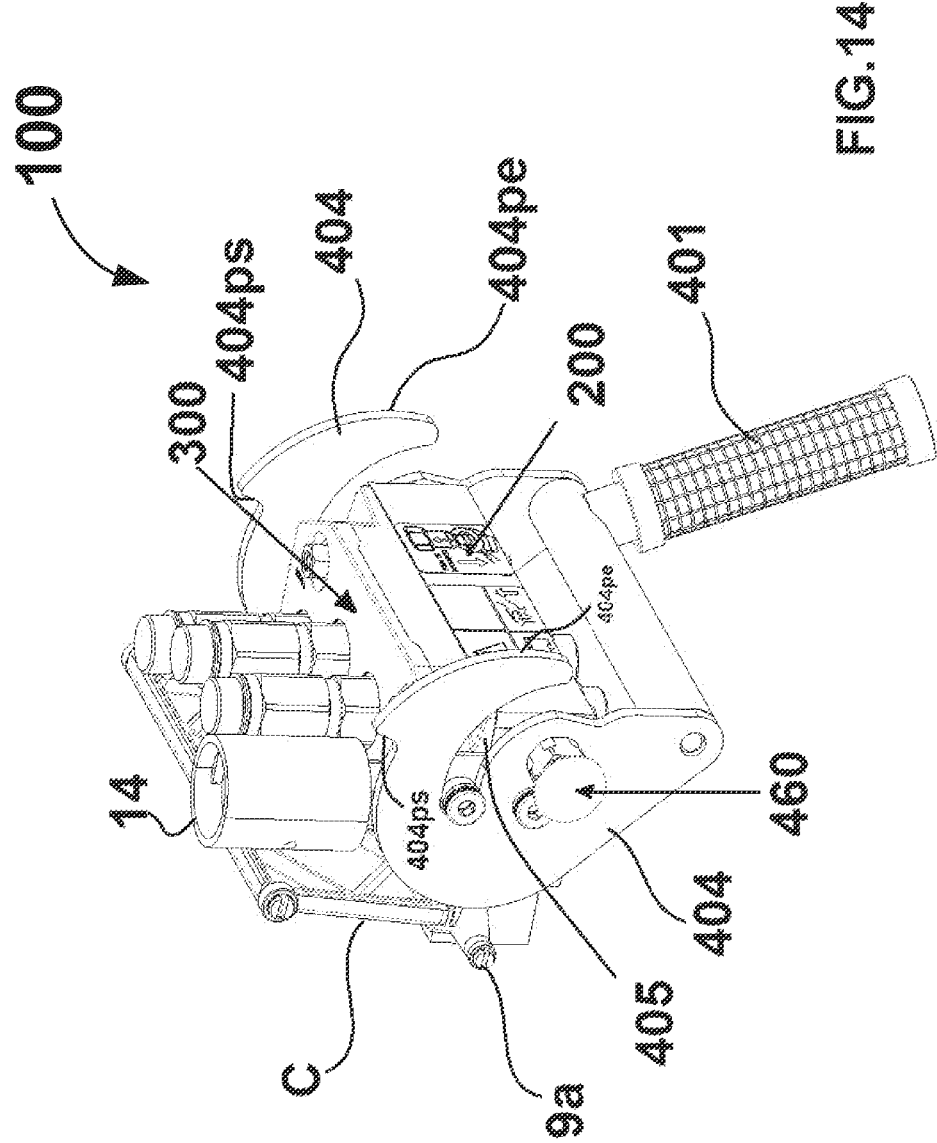

Starting from the mutual coupling condition in FIG. 14, the first operation to disconnect the mobile part 300 from the fixed part comprises releasing lever 401 by pressing on button 460.

Figure 15:
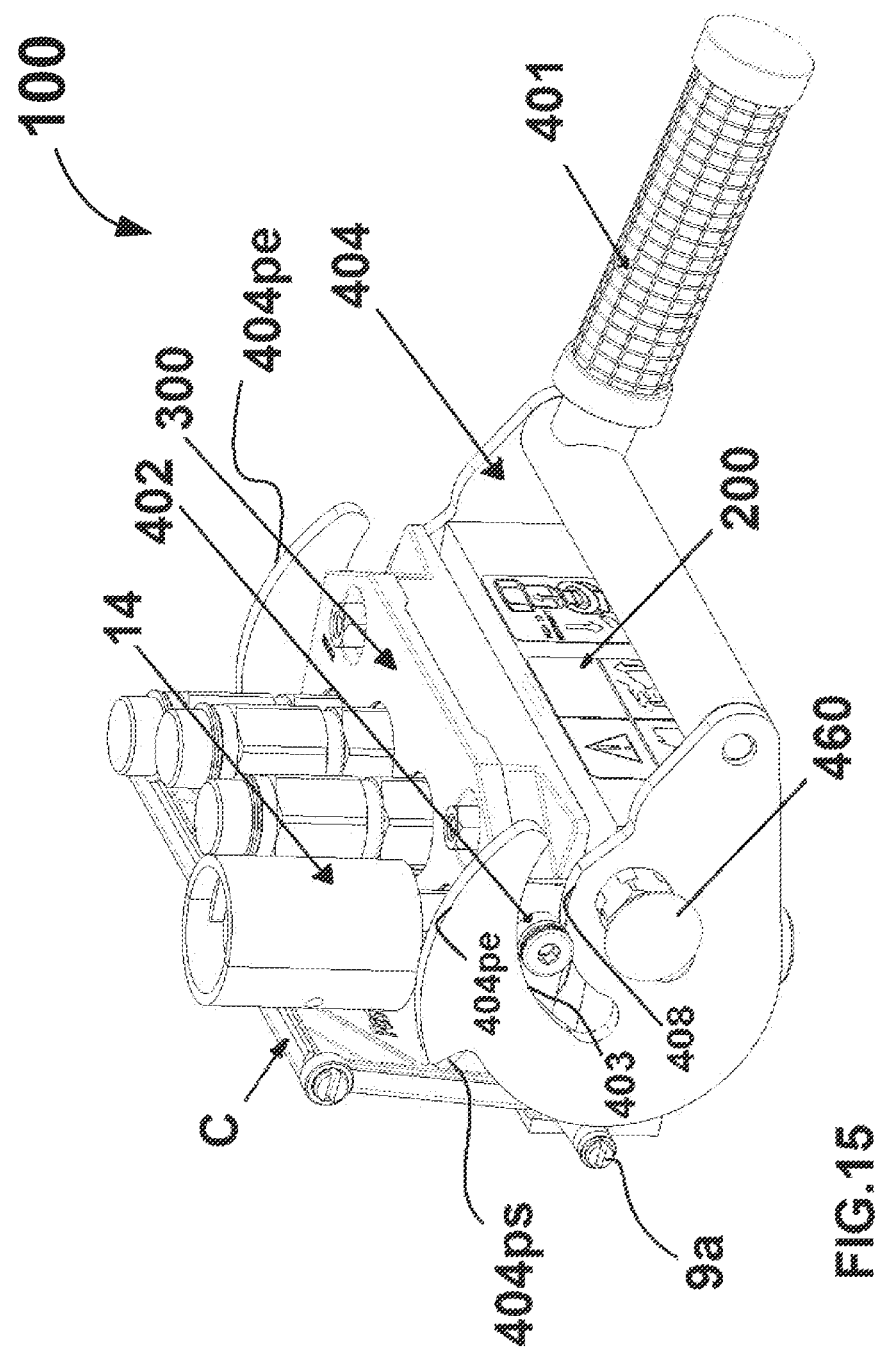

As depicted in FIG. 15, the release step then proceeds with the rotation of lever 401 and of the cams 404 towards the first end stop position, wherein during said first rotation, the rollers 402, which are integral with the mobile part 300, slide in the inner profile 405 (in the throat) of the respective cam 404, thus generating the separation of the mobile part 300 from the fixed part 200. Similarly to what occurs during the corresponding connection step, the cap or cover C remains in contact with sleeve 14 during this step.

FIG. 16 shows the completed whole rotation of the cams 404 and of lever 401, wherein having come into contact with the respective roller 9a, the bias surface 404ps of each of the cams 404 has induced the complete opening of the cap or cover C and therefore the detachment of the cap or cover C from sleeve 14.

The mobile part 300 may be removed from the fixed part 200 (FIG. 17) with the cams 404 in the position in FIG. 16.

FIG. 18 shows the successive intermediate step of repositioning lever 401 and cams 404 in the second end stop position; during this step, the rollers 9a and 9b each remain in contact with the respective surface 404ps of cam 404; in practice, under the bias exerted by the springs 13, the cap or cover C follows the cams 404 in the rotation thereof towards the second end stop position.

Instead, during the successive step (FIG. 19), the rollers 8a and 8b are each positioned in front of throat 405 of the respective cam 404, wherein the contact is interrupted between the rollers 9a 9b and surface 404ps of the respective cam 404.

FIG. 20 shows the mobile part 300 disconnected from the fixed part 200 and with the cap or cover C in closed position. It is worth noting how the rollers 8a and 8b are each locked in throat 405 of the respective cam 404, thereby any involuntary switching of the cap or cover C towards the open position being prevented.

Finally, FIG. 21 depicts a section with the mobile part 300 disconnected and with the cap or cover C closed, which shows the presence of a gasket 15 in the cap or cover C which is compressed against the fixed part 200 so as to ensure the hold against water and dirt, and therefore the perfect protection of the couplings 201.

It has therefore been demonstrated by means of the detailed description above of the embodiments of the present invention depicted in the drawings, that the present invention allows the preset objects to be obtained while overcoming the drawbacks encountered in the prior art.

In particular, the present invention allows the automatic switching of cover C from the second substantial end stop (closed) position to the first substantial end stop (open) position. Moreover, the present invention allows avoiding the accidental switching of the cover from the closed position to the open position, and also ensuring the perfect hold of cover C, and therefore ultimately the perfect and reliable protection of the fixed part 200, in particular of the one or more couplings 201.

Although the present invention has been explained above by means of a detailed description of the embodiments thereof depicted in the drawings, the present invention is not limited to the embodiments described above and depicted in the drawings. By contrast, all those modifications and/or variants of the embodiments described above and depicted in the drawings, which are obvious and apparent to persons skilled in the art, fall within the scope of the present invention.

For example, although the mobile 300 and fixed 200 parts in the embodiments described above with reference to the drawings include a plurality of couplings 301 and 201, respectively, the number of couplings may vary according to the needs and/or age or circumstances, from a minimum of one to a maximum which depends on the type of hydraulic circuits to be connected. Moreover, the lever may be rotatably fixed indifferently to the fixed part 200 (as in the examples described and depicted) and to the mobile part 300, wherein the engaging or contrast means 402 are part of the fixed part in this latter case.

And again, the couplings 201 and 301 may be of any type, for example but not necessarily, of the type including a self-retaining device (mutual between male coupling and female coupling), in particular with a ball ring and related housing throat in the male coupling and locking ring nut in the female coupling, the couplings with self-retaining device giving increased stability to the mechanical coupling between fixed part 200 and mobile part 300.

The object of the present invention is therefore defined by the claims.

The invention claimed is:

1. A fixed block of a pneumatic and/or hydraulic fastening device, said fixed block being adapted to be fixed to a main operating machine and, to be alternatively coupled to and released from, a mobile block, said fixed block comprising first mechanical coupling means adapted to be switched between a first position and a second position, wherein the switching of said first mechanical coupling means of said fixed block from said first position to said second position and, from said second position to said first position, translates into the progressive engagement of second engaging and coupling means of said mobile block and in the mechanical coupling of said fixed block and said mobile block and respectively in the disengaging of said second engaging and coupling means of said mobile block and therefore in the mechanical release of said fixed block and said mobile block, wherein said fixed block comprises a cover that can be switched between a first position and a second position; characterized in that said first mechanical coupling means and said cover are shaped in such a manner that, with said cover and said first coupling means in said second position, the switching of said first mechanical coupling means from said second position to said first position translates into the automatic switching of said cover from said second position to said first position.

2. The fixed block according to claim 1, wherein said cover comprises first engaging and coupling means, and wherein the switching of said first coupling means from said second position to said first position translates into the progressive mutual engagement of said first coupling means and of said first coupling and engaging means of said cover, and therefore in the automatic switching of said cover from said second position to said first position.

3. The fixed block according to claim 2, wherein said first coupling means define a first engagement surface, and wherein the switching of said first coupling means from said second position to said first position translates into the progressive mutual engagement of said first engagement surface of said first coupling means and said first engaging and coupling means of said cover, and therefore in the automatic switching of said cover from said second position to said first position.

4. The fixed block according to claim 3, wherein said first mechanical coupling means comprise a lever adapted to be switched by rotation which defines said first engagement surface, wherein the switching of said lever in said first position translates into the progressive mutual engagement of said first engagement surface of said lever and of said first engaging and coupling means of said cover.

5. The fixed block according to claim 1, wherein said first coupling means define a second engagement surface, wherein the switching of said first coupling means from said first position to said second position translates into the progressive mutual engagement of said second engagement surface and said second engaging and coupling means of said mobile block (300) and in the mechanical coupling of said fixed and mobile blocks.

6. The fixed block according to claim 5, wherein said second engagement surface is defined by said lever.

7. The fixed block according to claim 5, wherein said cover comprises second engaging and coupling means, and wherein with said cover in said second position, the switching of said first coupling means from said first position to said second position translates into the progressive mutual engagement of said second engagement surface and said second engaging and coupling means of said cover and in the mechanical coupling of said cover.

8. The fixed block according to claim 5, wherein said second engagement surface is shaped in such a manner that, with said fixed and mobile blocks mutually coupled, the switching of said first coupling means from said second position to said first position translates into a bias being exerted on said second engaging and coupling means of said mobile block by said second engagement surface, and wherein with said cover in said second position, the switching of said first coupling means from said second position to said first position translates into a bias being exerted on said second engaging and coupling means of said cover by said second engagement surface.

9. The fixed block according to claim 4, wherein said lever comprises a plate, and wherein said first engagement surface is defined by a portion of the outer peripheral surface of said plate.

10. The fixed block according to claim 9, wherein said second engagement surface is defined by a groove or blind notch which extends from said outer peripheral surface of said plate towards the inside of said plate.

11. The block according to claim 10, wherein said groove or notch comprises a blind end portion, and wherein with said fixed and mobile blocks mutually coupled and with said lever in said first switching position, said second engaging and coupling means are positioned at said blind end portion.

12. The fixed block according to claim 1, wherein said fixed block comprises at least a first male or female hydraulic coupling and is therefore adapted to constitute the end part of a first hydraulic circuit of said main operating machine.

13. The fixed block according to claim 12, wherein said first male or female hydraulic coupling of said fixed block is adapted to be hydraulically coupled respectively, to a second male or female hydraulic coupling of said mobile block, wherein said mobile block is therefore adapted to constitute the end part of a second hydraulic circuit of a piece of equipment.

14. The fixed block according to the claim 13, wherein said at least first hydraulic coupling of said fixed part and at least a second hydraulic coupling of said mobile part are adapted to be hydraulically coupled in order to achieve the hydraulic connection respectively, between said first and second hydraulic circuit of said main operating machine and said equipment, and wherein the switching of said first mechanical coupling means in said second position also translates into the mechanical coupling of said fixed and mobile blocks, also in the hydraulic connection respectively, between said first and second couplings of said fixed and respectively mobile blocks.

15. A pneumatic and/or hydraulic fastening device, said fastening device comprising a fixed block adapted to be fixed to a main operating machine and a mobile block, said fixed block comprising first mechanical coupling means adapted to be switched between a first position and a second position, wherein switching said first mechanical constraining means of said fixed block from said first position to said second position, and from said second position to said first position translates into the progressive engagement of said second engaging and coupling means of said mobile block and in the mechanical coupling of said fixed block and said mobile block and respectively in the disengaging of said second engaging and coupling means of said mobile block and therefore in the mechanical release of said fixed block and said mobile block, wherein said fixed block comprises a cover adapted to be switched between a first position and a second position; wherein said fixed block is a fixed block according to claim 1.

\* \* \* \* \*